US012088645B2

(12) United States Patent
Vaid et al.

(10) Patent No.: US 12,088,645 B2
(45) Date of Patent: *Sep. 10, 2024

(54) COLLABORATIVE BROWSING

(71) Applicant: Microsoft Technology Licensing, LLC, Redmond, WA (US)

(72) Inventors: Avi Ashish Vaid, Seattle, WA (US); Joseph Jiwoong Oak, Bellevue, WA (US); Mohamed Mansour, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/317,702

(22) Filed: May 15, 2023

(65) Prior Publication Data
US 2023/0291775 A1 Sep. 14, 2023

Related U.S. Application Data

(63) Continuation of application No. 17/808,710, filed on Jun. 24, 2022, now Pat. No. 11,689,588, which is a continuation of application No. 17/361,986, filed on Jun. 29, 2021, now Pat. No. 11,405,433.

(51) Int. Cl.
H04L 65/401 (2022.01)
G06F 3/0483 (2013.01)
(52) U.S. Cl.
CPC .......... H04L 65/401 (2022.05); G06F 3/0483 (2013.01)

(58) Field of Classification Search
None
See application file for complete search history.

(56) References Cited

U.S. PATENT DOCUMENTS

| 9,122,758 | B1* | 9/2015 | Blower | G06F 16/9535 |
| 2002/0083134 | A1* | 6/2002 | Bauer, Jr. | G06F 16/954 |
| | | | | 709/204 |
| 2004/0225716 | A1* | 11/2004 | Shamir | H04L 9/40 |
| | | | | 709/204 |
| 2007/0186007 | A1* | 8/2007 | Field | H04L 67/306 |
| | | | | 709/233 |

(Continued)

FOREIGN PATENT DOCUMENTS

WO WO-2012112709 A1 * 8/2012 ......... H04L 43/0817

Primary Examiner — Phyllis A Book

(57) ABSTRACT

Aspects of the technology described herein provide a collaborative browsing experience in which real-time browsing activity and saved browsing activity of session collaborators in a collaborative browsing session are shared with the collaborators. A collaborative session may be initiated, which may create a tab group associated with the session and linked to a collaborator. Other collaborators may be invited to join the session, and additional tab groups for each collaborator may be created. The tab groups of the collaborators may be included in a collective tab group, which may be updated in real-time with changes made by any of the collaborators. For example, client changes may be handled locally and communicated to a service to which each client is connected. The service may sequence and broadcast the ordered changes to the clients, which may each implement the changes according to the sequence to synchronize a shared state amongst clients.

20 Claims, 14 Drawing Sheets

(56) References Cited

U.S. PATENT DOCUMENTS

| | | | |
|---|---|---|---|
| 2009/0063990 A1* | 3/2009 | Morris | G06F 16/951 |
| | | | 715/751 |
| 2010/0042511 A1* | 2/2010 | Sundaresan | G06Q 10/10 |
| | | | 726/8 |
| 2010/0312595 A1* | 12/2010 | Lynn | G06Q 10/06313 |
| | | | 705/7.23 |
| 2013/0018960 A1* | 1/2013 | Knysz | G06Q 50/01 |
| | | | 709/204 |
| 2013/0218703 A1* | 8/2013 | Jakobson | G06Q 10/10 |
| | | | 705/26.2 |
| 2014/0052576 A1* | 2/2014 | Zelenka | G06Q 50/01 |
| | | | 705/26.41 |
| 2014/0207730 A1* | 7/2014 | Spataro | G06F 16/93 |
| | | | 707/608 |
| 2015/0039694 A1* | 2/2015 | Yoon | H04L 12/1818 |
| | | | 709/204 |
| 2015/0172228 A1* | 6/2015 | Zalepa | H04L 12/1813 |
| | | | 709/206 |
| 2021/0224765 A1* | 7/2021 | Siddique | G06Q 30/0643 |
| 2021/0383252 A1* | 12/2021 | Arnold | G06F 16/9558 |

* cited by examiner

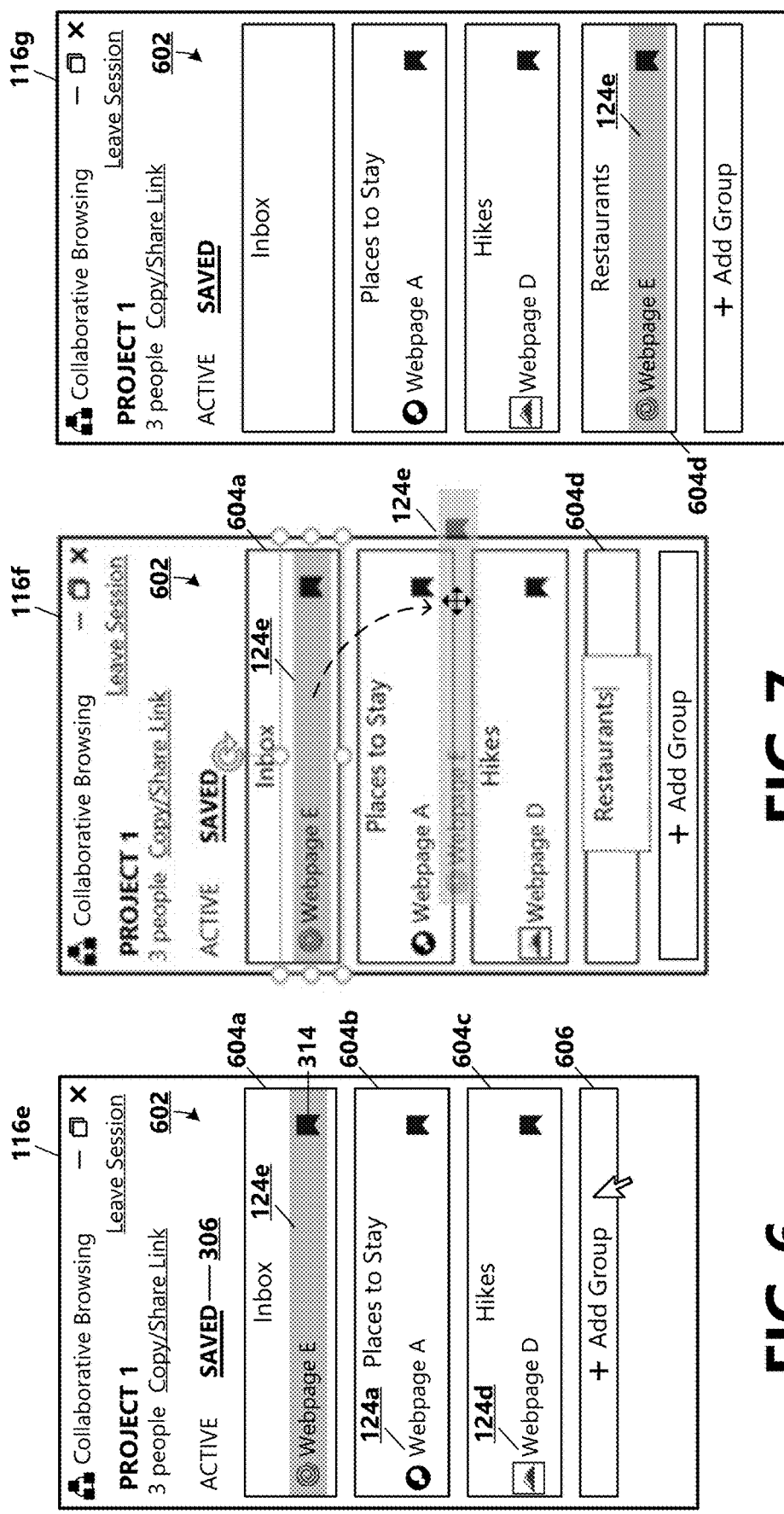

MOBILE COMPUTING DEVICE

COLLABORATIVE BROWSING

CROSS-REFERENCE TO RELATED APPLICATIONS

This application is a continuation of U.S. application Ser. No. 17/808,710 filed Jun. 24, 2022, which is a continuation of U.S. application Ser. No. 17/361,986 filed Jun. 29, 2021, now Issued U.S. Pat. No. 11,405,433 entitled "Collaborative Browsing," which applications are incorporated herein by reference in their entireties.

BACKGROUND

Currently, there is a need for a collaborative workspace and a collaborative session using the workspace in which real-time project-related activity and saved project-related activity of a group of browsing session collaborators can be shared amongst the project collaborators. One example of project-related activity that may be shared amongst project collaborators may include online browsing activity related to a project on which the collaborators are working together. For example, there are various types of situations where a collection of individuals (e.g., friends, family members, co-workers, classmates, organization members) may have a shared project (e.g., event, assignment, research document) on which the individuals may want to work collaboratively. However, current online browsing and team communication tools leave gaps in workflows for which users have to find a work around.

As an illustrative example, a group of friends may want to collaboratively plan a trip. Various information resources for different aspects of the trip may be available on a network (e.g., online). For example, resources for lodging, transportation, dining, entertainment, blogs, and other information associated with aspects of the trip may be accessible to the individuals via the Internet. Currently, in an attempt to collaborate on planning the trip, each friend may individually gather information about various aspects of the trip and then share the information by sending links to the resources to the other friends via text messages, emails, social media messages, and the like. The friends may then individually use the links to access some or all of the shared information. However, as can be appreciated, trying to work together collaboratively in this way can be difficult, and the individuals may have to find various workarounds to plan the trip collaboratively.

As one example, it can be difficult to keep track of or organize the shared links. Consider that the links may be shared in a series of group or individual text messages or email conversations between the friends, amongst discussions and comments about the information included in the links and other discussions. Moreover, multiple links may be shared about a common topic. For example, the friends may share links to different activities in which they may each be interested. When an individual wants to access information about a particular topic, the individual may find it difficult to find the links associated with the topic, to piece together relevant information, or to keep track of the links that the individual has already viewed. Further, if another friend wants to later join the group, it can be challenging to find and share the relevant links with the other friend; and oftentimes, some information may inadvertently be excluded. Moreover, workarounds may need to be found to enable multiple individuals to view the same information simultaneously or to keep track of others' information gathering or information browsing activities. As an example, currently, a friend in the friend group may have to use a separate online meeting tool with a screen sharing functionality in order to share real-time browsing activity with one or more other friends. Such online meeting tools may only allow for one friend to share their screen, and thus their browsing activity, at a time.

It is with respect to these and other general considerations that embodiments have been described. Also, although relatively specific problems have been discussed, it should be understood that the embodiments should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects of the present disclosure are directed to a method, system, and computer readable storage device for providing a collaborative browsing workspace and session in which real-time project-related activity and saved project-related activity of the browsing session collaborators can be shared amongst the collaborators.

In some examples, a system is provided for providing collaborative browsing, the system comprising: at least one processing device; and at least one computer readable data storage device operatively connected to the at least one processing device and storing instructions that, when executed by the at least one processing device, cause the system to: initiate, at a first collaborative browsing client operating on a first client computing device, a collaborative browsing session with a collaborative browsing service; create a first tab group associated with the first collaborative browsing client, wherein the first tab group includes one or more tabs corresponding to one or more webpages open in a user interface of a web browser operating on the first client computing device; include the first tab group in a collective tab group; display the collective tab group in a collaborative user interface; receive a message from the collaborative browsing service associated with a second collaborative browsing client operating on a second client computing device joining the session; update the collaborative user interface with a second tab group associated with the second collaborative browsing client; monitor for a data change event related to the first tab group or the collective tab group; when a recognized data change event related to the first tab group or the collective tab group is received, perform an associated first data change operation; and notify the collaborative browsing service about the first data change operation.

In some examples, a computer-implemented method for providing collaborative browsing, the method comprising: initiating, at a first collaborative browsing client operating on a first client computing device, a collaborative browsing session with a collaborative browsing service; creating a first tab group associated with the first collaborative browsing client, wherein the first tab group includes one or more tabs corresponding to one or more webpages open in a user interface of a web browser operating on the first client computing device; including the first tab group in a collective tab group; displaying the collective tab group in a collaborative user interface; receiving a message from the collaborative browsing service associated with a second collaborative browsing client operating on a second client computing device joining the session; updating the collaborative user interface with a second tab group associated with the second collaborative browsing client; monitoring for a data change event related to the first tab group or the collective tab group; when a recognized data change event related to the first tab group or the collective tab group is received, performing an associated first data change operation; notifying the collaborative browsing service about the first data change operation; receiving a message from the collaborative browsing service including the first data change operation, a second data change operation corresponding to a data change event performed by the second collaborative browsing client, and sequence numbers associated with the first data change operation and the second data change operation; and performing the second data change operation based on the sequence numbers to synchronize a shared state amongst the connected collaborative browsing clients.

In some examples, a computer readable storage device including computer readable instructions, which when executed by a processing unit the processing unit is configured to: initiate, at a first collaborative browsing client operating on a first client computing device, a collaborative browsing session with a collaborative browsing service; create a first tab group associated with the first collaborative browsing client, wherein the first tab group includes one or more tabs corresponding to one or more webpages open in a user interface of a web browser operating on the first client computing device; include the first tab group in a collective tab group of a collaborative user interface; in response to a second collaborative browsing client operating on a second client computing device joining the session, update the collaborative user interface with a second tab group associated with the second collaborative browsing client; detect a data change event related to the first tab group, the second tab group, or the collective tab group; in response to the data change event, perform a data change operation corresponding to the data change event, wherein the data change operation synchronizes a shared state amongst the first collaborative browsing client and the second collaborative browsing client.

Examples may be implemented as a computer process, a computing system, or as an article of manufacture such as a device, computer program product, or computer readable medium. According to an aspect, the computer program product is a computer storage medium readable by a computer system and encoding a computer program of instructions for executing a computer process. The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIG. 6 is an illustration showing another example user interface that may be provided as part of a collaborative browsing session;

FIG. 7 is an illustration showing another example user interface that may be provided as part of a collaborative browsing session;

FIG. 8 is an illustration showing another example user interface that may be provided as part of a collaborative browsing session;

DETAILED DESCRIPTION

Figure 1:
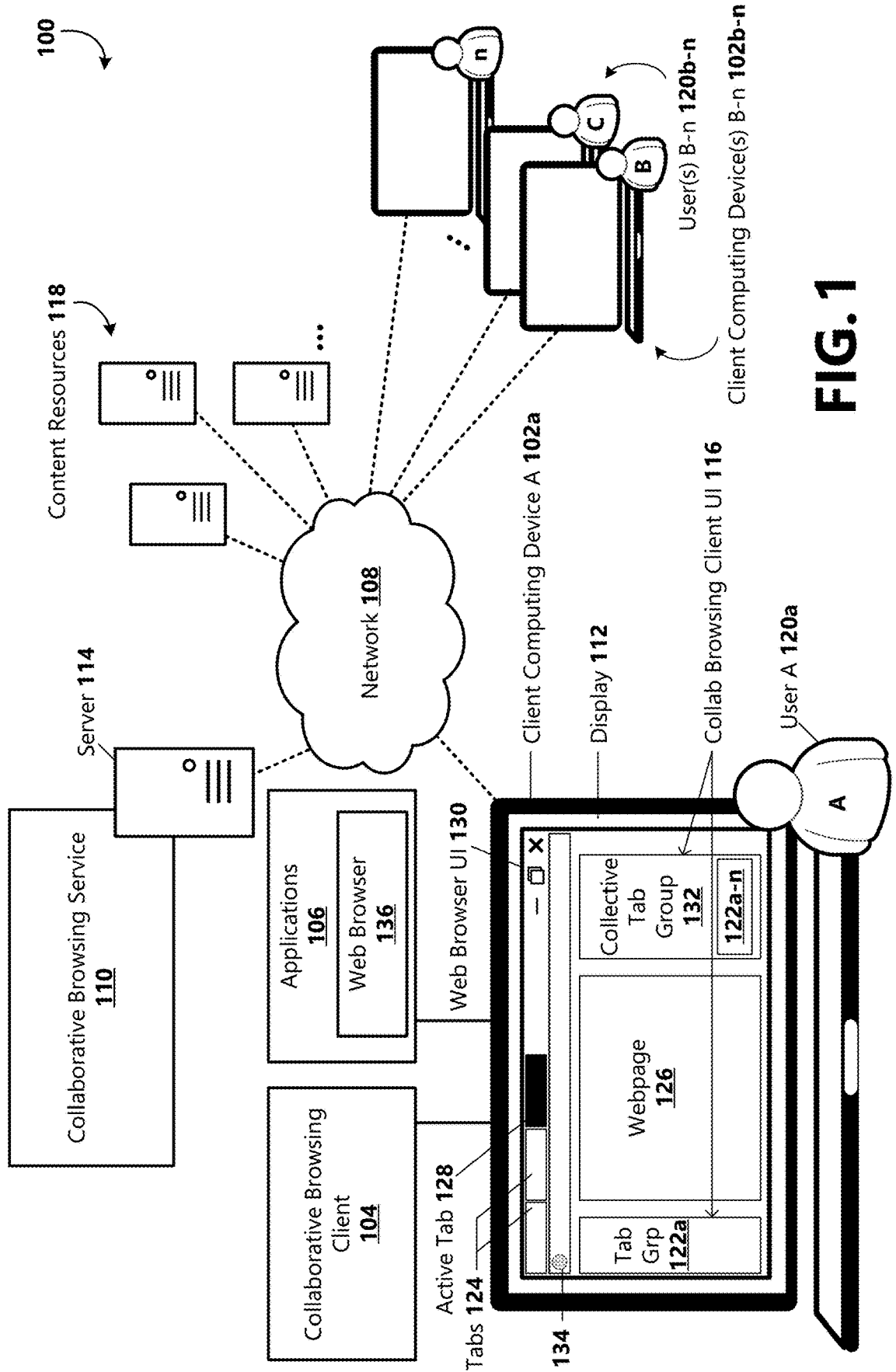
FIG. 1 is a block diagram showing an example operating environment in which a collaborative browsing system can be implemented, for example, to provide collaborative browsing.
Figure 2:
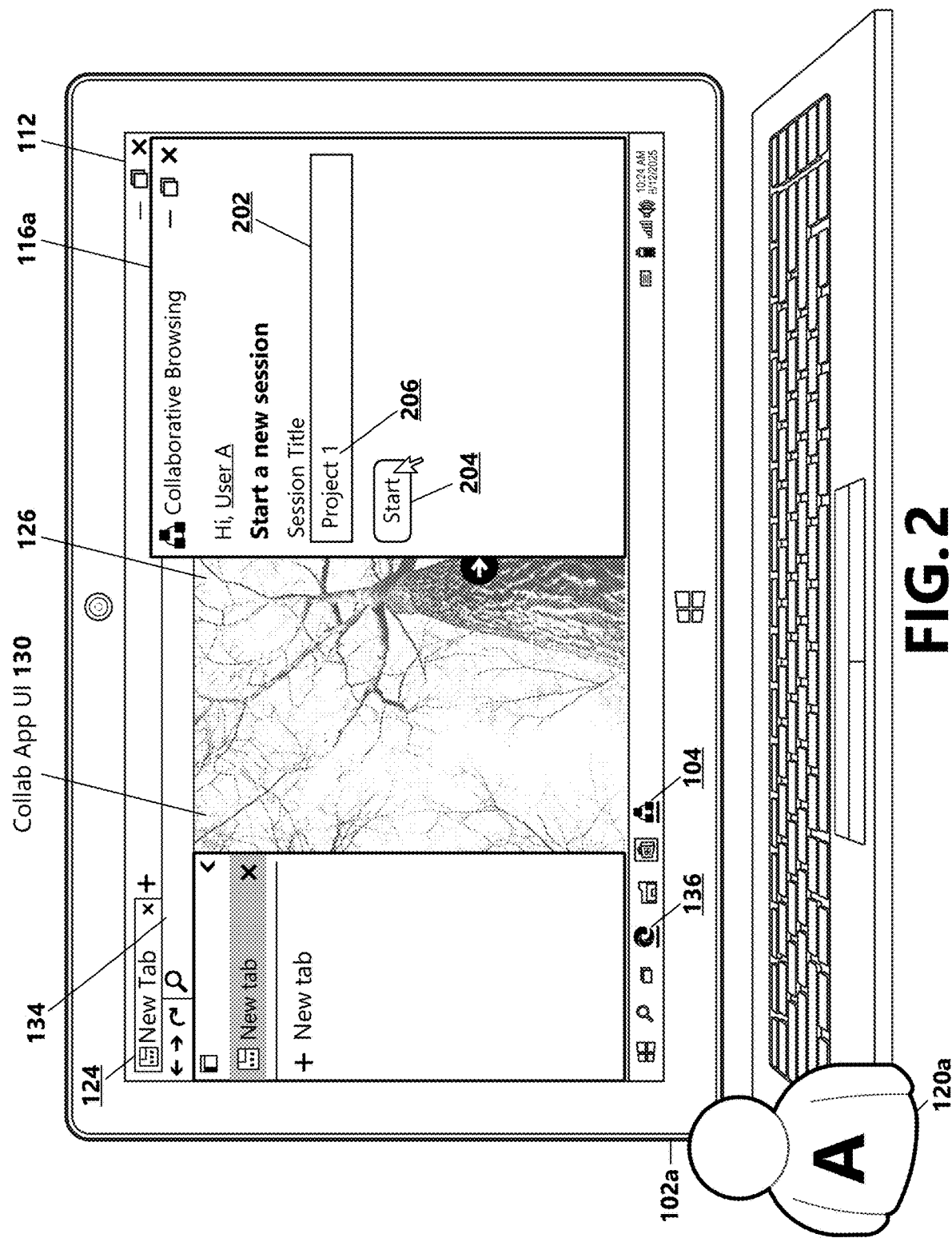
FIG. 2 is an illustration showing an example user interface that may be provided for initiating a collaborative browsing session.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer readable storage device for providing a collaborative browsing workspace and session in which real-time project-related activity and saved project-related activity of the browsing session collaborators can be shared amongst the collaborators. With reference now to FIG. 1, a block diagram is provided showing an example operating environment in which aspects of a collaborative browsing system 100 can be implemented, for example, to provide a collaborative browsing workspace and session. It should be understood that this and other arrangements described herein are provided as examples. Other arrangements and elements can be used in addition to or instead of those shown in FIG. 1. Various functions described herein as being performed by one or more elements or components can be carried out by hardware, firmware, and/or software. For example, functions can be carried out by a processor executing instructions stored in memory.

In the context of this description, the system of FIG. 1 may be described as a collaborative browsing service. It should be recognized that the applications for which the technology described herein may be utilized need not be limited to online browsing applications. Any type of application, in which it may be useful to provide a collaborative workspace connected to a project in which real-time project related activity and saved project information resources can be shared with the project collaborators, can benefit from the technology described herein. For example, aspects of the present disclosure may be implemented to drive shared outcomes within groups.

FIG. 1 includes a collaborative browsing service 110, which may operate on a server 114 communicatively connected via a network 108 to a plurality of client computing devices 102a-n (generally, client computing devices 102). As used herein, "n" may represent a variable number of the aforementioned component. In some examples, each client computing device 102 may include a collaborative browsing client 104 that may be configured to initiate or join a collaborative browsing session with other collaborative browsing clients 104a-n (generally, collaborative browsing client 104) via a connection with the collaborative browsing service 110. As will be described in further detail below with reference to FIG. 10, in some examples, the collaborative browsing service 110 and the collaborative browsing clients 104 may be implemented using a collaborative framework, such as FLUID FRAMEWORK by MICROSOFT CORPORATION of Redmond, WA, that may include a collection of client libraries for distributing and synchronizing shared state. For example, the client libraries may allow multiple collaborative browsing clients 104 to simultaneously create and operate on shared data structures using coding patterns similar to those used to work with local data.

In some examples, the collaborative framework may operate to manage client connections to services (e.g., collaborative browsing service 110) and to keep collaborative browsing clients 104 in sync using an event broadcast model to manage messages between clients. For example, when data on a collaborative browsing client 104 changes, a notification may be sent to the collaborative browsing service 110 along with the change. The collaborative browsing service 110 may operate to sequence all incoming data change operations and then broadcast the data change operations to all connected clients 104. In some examples, the collaborative browsing service 110 may further operate to save data change operations to persistent data storage. In some examples, each collaborative browsing client 104 may further operate to incorporate the sequenced data change operations into local data and then handle the data change operations (e.g., update a user interface (UI), run business logic). For example, each collaborative browsing client 104 may be able to use that sequence to independently and accurately produce the current state regardless of the order it receives data change operations.

According to an example implementation, the collaborative browsing service 110 may not be a centralized service for all collaborative browsing sessions. Rather, for each collaborative browsing session, a single collaborative browsing service 110 may be utilized. In some examples, a collaborative browsing client 104 may be configured to connect to the collaborative browsing service 110 using a WebSocket protocol.

According to an example, each of the client computing devices 102 may be used by an individual who may be working collaboratively with other individuals on one or more projects. These individuals are herein referred to as collaborators or collaborative users 120a-n (generally, users 120). Each of the client computing devices 102 shown and described herein may be implemented as a variety of computing devices, such as the computing devices 1100, 1200, 1305a,b,c described in reference to FIGS. 11, 12A, 12B, and 13. As an example, the client computing devices 102 can be one of various types of computing devices, such as tablet computing devices, desktop computers, mobile communication devices, laptop computers, laptop/tablet hybrid computing devices, large screen multi-touch displays, vehicle computing systems, gaming devices, smart televisions, wearable devices, internet of things (IoT) devices, etc. While a limited number of client computing devices 102 are illustrated, a large number of client computing devices 102 may be in communication with the collaborative browsing service 110 via the network 108 at any time. The plurality of client computing devices 102 may communicate with the collaborative browsing service 110 via the network 108, which may include a combination of networks. For example, the network(s) 108 may include a public network, a private network, or a combination of public and private networks, such as the Internet.

In some examples, a number of applications 106 may be stored on and may operate on the client computing devices 102 for performing various tasks. One example application 106 may include a web browser application, herein referred to as a web browser 136. For example, the web browser 136 may be used to access content available via the network 108. When a user of a client computing device 102 requests a webpage 126 from a website, the web browser 136 may retrieve the requested content from a web server, herein referred to as a content resource 118. The web browser 136 may further operate to display the content in an application UI 130 (e.g., web browser UI 130) that may be rendered on a display 112 associated with the client computing device 102. In some examples, the web browser UI 130 may operate as a window or other UI object within which application content may be displayed and interacted. In the context of the example scenario described in the Background section where a group of friends may want to collaboratively plan a trip, the various information resources for different aspects of the trip (e.g., lodging, transportation, dining, entertainment, blogs, and other information) may be represented by the content resources 118 illustrated in FIG. 1. Likewise, in other example scenarios, other types of information resources for other types of collaborative projects may be represented by the content resources 118 illustrated in FIG. 1.

As mentioned above, the client computing devices 102 may further include the collaborative browsing client 104. In some examples, the collaborative browsing client 104 may be installed on the client computing devices 102 as a plug-in or add-on to one or more applications 106. In other examples, the collaborative browsing client 104 may be embedded in one or more applications 106. In an example implementation, the collaborative browsing client 104 may be embedded in or may operate as a plug-in or add-on to the web browser 136. Although examples are given herein primarily in terms of web browsing collaborative sessions, one of ordinary skill in the art will appreciate that the teachings of the present disclosure may be applied to other applications 106 that a group of individuals may use to collaborate on a project for producing a shared outcome, such as collaborative team applications (e.g., MICROSOFT TEAMS software from MICROSOFT CORPORATION of Redmond, WA), productivity applications (e.g., word processing applications, spreadsheet applications, presentation applications, computer aided drawing applications), or other types of applications.

In some examples, the collaborative browsing client 104 may operate to initiate and/or join a collaborative browsing session within the context of a project which a plurality of users 120 may share project-related activity information. In some examples, a collaborative browsing session may include a connection between the collaborative browsing client 104 and the collaborative browsing service 110 and a period of user activity (e.g., web browsing activity) in association with a project. For example, the project may be a project which a plurality of users 120 may work together on, for example, to obtain or produce information about a particular subject or endeavor and to further organize the information for a shared outcome.

In some implementations, each collaborative browsing session may have a link associated with it that can be shared with other individuals. In some examples, an individual who has access to a project link may be enabled to join the collaborative browsing session as a collaborative user 120. In other examples, only users 120 who have been invited to join the collaborative browsing session may be allowed to join. For example, an authorization process may be performed to grant an authorized user 120 access to join the project collaborative browsing session. For example, when an individual is joined as a user 120 in a collaborative browsing session, the individual may be enabled to share local project-related activity with the other users 120 included in the collaborative browsing session and to view a real-time display of the activity of the other users 120 included in the collaborative browsing session.

Each user 120 may be a user of a client computing device 102 of the plurality of client computing devices 102 on which a web browser 136 and the collaborative browsing client 104 may operate. The project may be one of various types of projects that may range from personal events to work projects to school assignments to media content, etc. In some example implementations, the web browser 136 may operate as one of a plurality of applications 106 that the users 120 may use to access or create information for the project.

In some examples, when a collaborative browsing session is initiated or joined, the collaborative browsing client 104 may operate to create a tab group 122 that is associated with the session and that is linked to the user 120. For example, the tab group 122 may include a list of one or more tabs 124, where each tab may correspond to a web document or webpage 126 that may be open in the user's web browser 136. The term "tab" may be used herein to describe a navigational UI element that may be used for enabling the web browser 136 to open more than one web document or webpage 126 (referred to herein generally as a webpage 126) in a single web browser UI 130 (e.g., a window) and that can be used for switching between the webpages 126. In some examples, the tabs 124 may be included in a row of tabs 124 at the top of the web browser UI 130. In other examples, the tabs 124 may be listed vertically in a tab pane that may be positioned on a side of the web browser UI 130. In an example, multiple webpages 126 may be opened in multiple tabs 124 in the web browser UI 130 in a collaborative browsing session, which may be listed in the tab pane and organized into a project tab group associated with the session. In some examples, a tab 124 may be represented by a page title associated with the webpage 126. In other examples, a tab 124 may be represented by an address of the webpage 126, an icon, or other representation of the webpage 126.

In some examples, the collaborative browsing client 104 may be operative or configured to initiate and/or join more than one collaborative browsing session with the same or different users 120. For example, the first tab group 122a may represent current browsing activity of the local user (e.g., user A 120a) in relation to the first project; and one or more additional tab groups 122 may additionally be created by the collaborative browsing client 104 in association with one or more additional current collaborative browsing sessions in which user A 120a may be joined.

In some examples, the collaborative browsing client 104 may be further configured to monitor for data changes associated with the tab group 122 and to communicate those changes to the collaborative browsing service 110. In some example implementations, a data change may describe an event that may be handled by the web browser 136 (e.g., a web browser event) or by the collaborative browsing client 104. In an example, the data change may be generated or triggered by the web browser 136, the collaborative browsing client 104, the user 120, or in other ways. One example data change operation may include an addition of a tab 124 to the tab group 122 in response to an opening of another webpage 126 in the web browser UI 130. Another example data change operation may include a deletion of a tab 124 from the tab group 122 in response to a closure of a webpage 126. Another example data change operation may include a change of an active tab 128 in response to a selection of webpage 126 to be opened and displayed in the web browser UI 130.

Another example data change operation may include a change of a tab 124 included in the tab group 122 in response to a change to a Uniform Resource Locator (URL) (i.e., webpage address) in an address bar 134 of the web browser 136. In an example, the URL change event may include a first property comprising the new URL to which the web browser UI 130 may be navigating. In some examples, the URL change event may include a second property comprising the previous URL from which the web browser UI 130 may be navigating. In some examples, responsive to the URL change in the address bar 134, the corresponding tab 124 included in the tab group 122 may be updated to show the page title (or other representation) of the new webpage 126.

As an example, during a collaborative browsing session related to a project, a first webpage 126a may be displayed in the web browser UI 130, and a tab 124 associated with the first webpage 126a may be included in the tab group 122a created for the session. User A 120a may decide to navigate to a second webpage 126b and may enter the second webpage's URL or may select a link to the second webpage 126b, which may cause the URL in the address bar 134 to change to the URL of the second webpage 126b. In some examples, the collaborative browsing client 104 may be configured to use an event listener to monitor for the URL change, and when detected, may call one or more functions that may operate to update the corresponding tab 124 in the tab group 122a and communicate the URL change event to the collaborative browsing service 110.

As described above, the collaborative browsing service 110 may operate to receive the data change operations from a plurality of connected collaborative browsing clients 104, sequence the data change operations, and return the sequenced operations to the connected clients. For example, in sequencing incoming data change operations, the collaborative browsing service 110 may be configured to assign monotonically increasing sequence numbers to the incoming operations. The collaborative browsing service 110 may be further configured to then broadcast the data change operations to all connected collaborative browsing clients 104, including the sequence numbers.

In some examples, each collaborative browsing client 104 may be configured to perform merge logic by using the sequence numbers to produce the current state of the collaborative browsing session. According to an example, in producing the current state of the collaborative browsing session, the collaborative browsing clients 104 may be configured to update a collective tab group 132 by incorporating the sequenced data change operations into local data and then handling the data change operations, such as via updating a UI (e.g., collaborative browsing client UI 116). Accordingly, real-time browsing activity information associated with each user 120 joined in the collaborative browsing session may be provided. In some examples, unlike in some existing collaborative systems where merge logic may be implemented by a server 114, aspects of the collaborative browsing system described herein may reduce latency introduced during server-side processing of merge logic by moving the merge logic from the server 114 to the client (e.g., client computing devices 102).

In some examples, the collective tab group 132 may include a list of active resources and a list of saved resources, wherein the active resources list may provide the real-time browsing activity information associated with each user 120 joined in the collaborative browsing session, and the saved resources list may provide a collection of user-saved browsing activity information. According to an example, the real-time browsing activity information may be presented as a collective display of the tab groups 122 of the users 120. For example, each user's tab group 122 included in the collective tab group 132 may include a list of the tabs 124 opened in the user's web browser UI 130. According to another example, the user-saved browsing activity information may be presented as a list of tabs 124 associated with webpages 126 bookmarked or saved by one or more users 120 in one or more collaborative browsing sessions associated with the project.

In some examples, the list of tabs 124 included in the collective tab group 132 (e.g., the active resources list and/or the saved resources list) may be automatically and/or manually grouped according to one or more attributes. In one example, the list of tabs 124 may be organized based on the user 120. In another example, the list of tabs 124 may be organized based on a tab category. In some examples, the tab category may be input by a user 120. In other examples, the collaborative browsing client 104 may be configured to automatically suggest or populate tab categories for tabs 124 included in the collective tab group 132. In some examples, the collaborative browsing client 104 may be configured to suggest or populate tab categories based on machine learning techniques. For example, a tab category may be automatically determined for one or more tabs 124 based on an analysis of the corresponding webpage 126 data and/or metadata. In some examples, the collective tab group 132 may further comprise additional project-related information.

In some examples, the collaborative browsing client 104 may be further configured to monitor for locally applied data changes associated with the collective tab group 132 and to communicate those changes to the collaborative browsing service 110 for browsing with the other connected collaborative browsing clients 104. For example, the other connected collaborative browsing clients 104 may operate to apply the data change operations corresponding to the remotely applied collective tab group 132 data changes, such that tab group state may be replicated across the connected collaborative browsing clients 104.

An example data change to the collective tab group 132 may include an addition of a webpage tab 124 to or a deletion of a tab 124 from the saved resources list. As an example, user A 120a may want to denote importance of or have quick access to a particular webpage 126 that may be included in user A's or another user's tab group 122 included in the collective tab group 132 for a project. Accordingly, user A 120a may select to save or bookmark the webpage tab 124, which may add the tab to the saved resources list included in the collective tab group 132.

Another example data change to the collective tab group 132 may include an addition of, a deletion of, or a change to a tab group attribute (e.g., a tab category). As an example, a tab category may describe an attribute of the project which one or more tabs in the collective tab group 132 may be grouped. For example, the tab category may be applied to tabs 124 included in the saved resources list such that webpage links that are similar or otherwise relevant to the tab category may be grouped together.

Another example data change may include an addition of, a deletion of, or a change to a note, comment, or vote input by a user 120 in association with a tab 124 included in the collective tab group 132. For example, a user 120 may add a note directed to other users 120 about a particular webpage 126 that may be included in the collective tab group 132. As an example, user A 120a may navigate to the webpage 126 of a restaurant that user A 120a may be familiar with and may have an opinion which user A 120a may want to share with the other users 120b-n. In a comment field that may be provided in the collaborative browsing client UI 116, user A 120a may input a comment that may be linked the to the tab 124 and that may be visible to other users 120b-n. Other local data changes associated with a tab group 122 and/or collective tab group 132 that the collaborative browsing client 104 may operate to monitor for and communicate to the collaborative browsing service 110 are possible and are within the scope of the present disclosure.

In some examples, in incorporating a data change broadcasted by the collaborative browsing service 110, the collaborative browsing client 104 may be configured to update the collaborative browsing client UI 116 based on the broadcasted data change operations. As an example, the collective tab group 132 may be updated to reflect an addition of, a deletion of, or an update to a tab 124; a saved or bookmarked tab; a tab group attribute; a note, comment, or vote; an active tab 128, or another remotely applied data change operation broadcast by the collaborative browsing service 110.

FIGS. 2-8 include illustrations of various example UIs that may be provided as part of a collaborative browsing session according to an example scenario. For example, and with reference to FIG. 2, in the example scenario, a first user (user A 120a) may want to initiate a collaborative browsing session. Accordingly, user A 120a may selectively open the collaborative browsing client 104, and a first example collaborative browsing client UI 116a may be displayed on the display 112 of the client computing device 102a. For example, the collaborative browsing client 104 may be configured to interoperate with the web browser 136. In some examples, the example collaborative browsing client UI 116a may include one or more fields or options that may enable the user 120 to apply various details that may pertain to the session (e.g., a session title, a scheduled date, a duration, an application 106, restrictions). In the illustrated example, a session title field 202 for entering a title 206 for the collaborative browsing session that user A 120a wants to initiate and a start option 204 for initiating the collaborative browsing session may be provided.

Figure 3:
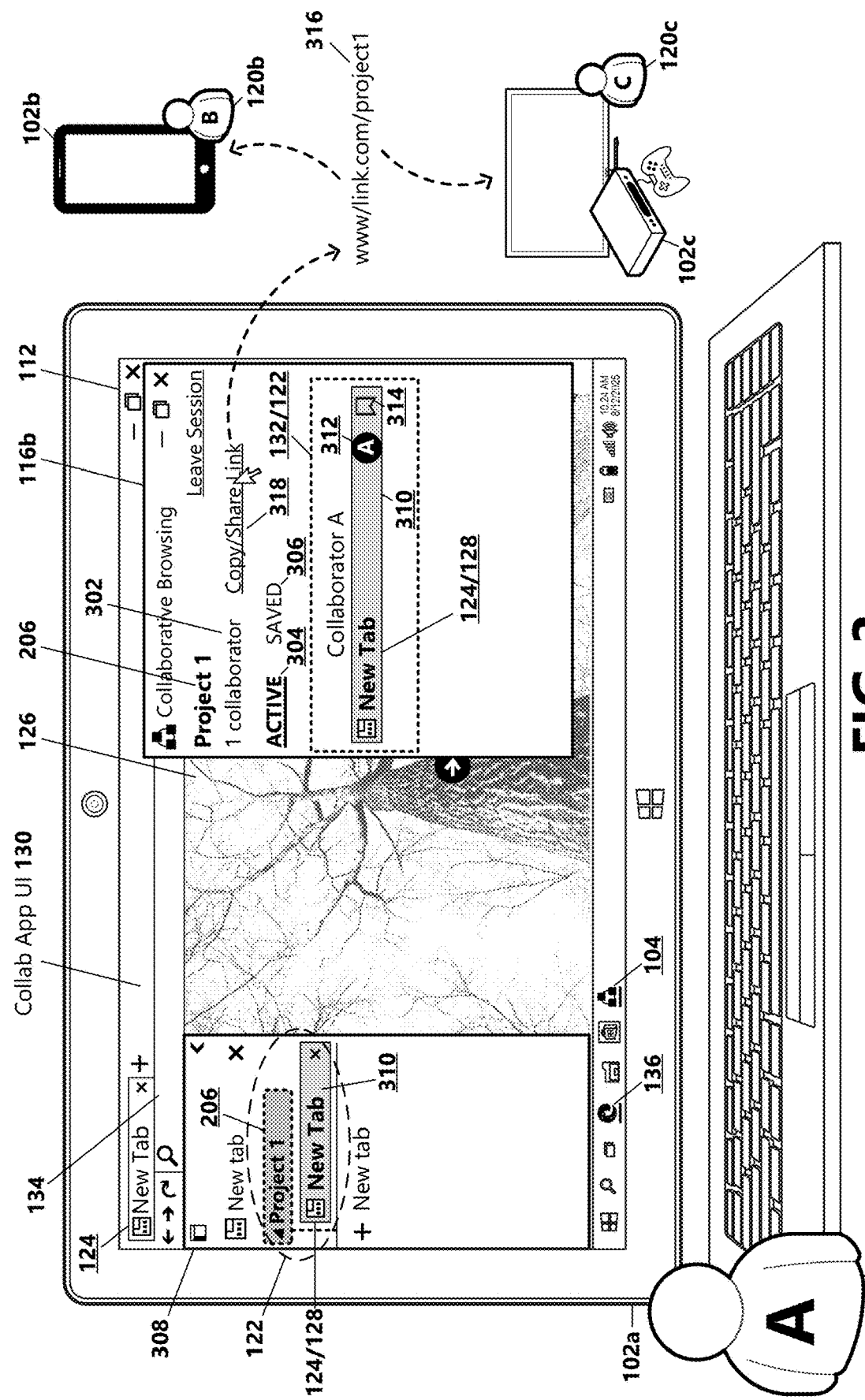
FIG. 3 is an illustration showing an example user interface that may be provided as part of a collaborative browsing session.

With reference now to FIG. 3, another example collaborative browsing client UI 116b is shown displayed on the display 112 of the client computing device 102a. For example, in response to an initiation of a collaborative browsing session, such as via a selection of the start option 204 (shown in FIG. 2), the UI may be updated to display the example collaborative browsing client UI 116b. According to an example, the example collaborative browsing client UI 116b may include the title 206 of the session assigned by user A 120a. According to another example, the example collaborative browsing client UI 116b may further include an indication 302 of the number of collaborative users 120 joined in the session. In the illustrated example, user A 120a is currently the only user, and accordingly, the indication 302 of the number of users 120 is shown as 1. In some examples, the example collaborative browsing client UI 116b may further include an active resources list selector 304 and a saved resources list selector 306, which may enable the user 120 to select between displaying real-time browsing activity information associated with each user 120 joined in the collaborative browsing session or a list of tabs 124 saved by one or more users 120. In other examples, the active resources list selector 304 and the saved resources list selector 306 may be combined into a single selector. In the example illustrated, the active resources list selector 304 is shown selected.

In some examples, in response to joining the collaborative browsing session, the collaborative browsing client 104 may be further configured to create and insert a tab group 122 associated with the collaborative browsing session into the web browser tab pane 308. For example, the tab group 122 may include the title 206 of the session selected by user A 120a, under which, during the collaborative session, the tabs 124 open in the web browser UI 130 may be listed. In the illustrated example, a webpage 126 that may be displayed in the web browser UI 130 when the web browser 136 is launched (e.g., a New Tab page) is shown, and accordingly, a tab 124 corresponding to the webpage 126 may be included in the tab group 122. In some examples, an active tab indicator 310 operative to indicate the tab 124 associated with the webpage 126 currently being displayed in the web browser UI 130 may additionally be provided in the tab group 122. According to one example, the active tab indicator 310 may be presented as highlighting of the active tab(s) 128. In some implementations, each user 120 in the session may have a different color or pattern code associated with the user, and the highlighting may be displayed according to the local user's color or pattern coding. In some examples, one or more other design features associated with the tab group 122 may include the color or pattern coding.

As mentioned above, in some examples, and as shown in the example illustrated in FIG. 3, the active resources list selector 304 may be selected. Accordingly, the example collaborative browsing client UI 116b may be further configured to display the active resources list, wherein the active resources list may include a collective tab group 132 including a collective display of the tab groups 122 of all the users 120 joined in the collaborative browsing session. Since, at this time, user A 120a is the only current collaborative user 120 in the session, only user A's tab group 122 is included in the collective tab group 132.

In some examples, each user's local tab group 122 included in the collective tab group 132 may include one or more collaborator identifiers that may provide an indication of which local tab group 122 is associated with which user 120. One example collaborator identifier may include color or pattern coding, wherein one or more design elements associated with each user's local tab group 122 may be displayed according to the color or pattern assigned or selected by the user 120. Another example collaborator identifier may include a marker 312 that may include a name, initial(s), an icon, or other indication or representation of the associated user 120. In some examples and as illustrated in FIG. 3, the marker 312 may be used to indicate the active tab 128 of the users 120. In some examples, one or more additional or alternative active tab indicators 310 may be used to allow all the users 120 joined in the collaborative browsing session to have real-time knowledge of which webpage 126 each of the other users 120 may be currently viewing. As an example, and as illustrated, the active tab 128 in each tab group 122 in the collective tab group 132 may be displayed with highlighting, which, in some implementations, may include the user's color or pattern code.

In some examples, a save option 314 may be provided in association with each tab 124 included in each tab group 122 in the collective tab group 132. For example, selection of the save option 314 may cause the collaborate browsing client 104 to add the associated tab 124 to the saved resources list. In some examples, when the saved resources list selector 306 is selected, the collaborative browsing client UI 116 may be updated to display the list of tabs 124 bookmarked or saved by one or more users 120.

As mentioned above, each collaborative browsing session may have a session link 316 associated with it. In some examples, the example collaborative browsing client UI 116b may further include a copy/share link option 318, which when selected, may enable the session link 316 to be shared with one or more other individuals via one or more electronic communication channels. In some examples, one or more link browsing options may be provided in the collaborative browsing client UI 116. As illustrated in FIG. 3, user A 120a has shared the session link 316 with two individuals, who, once joined in the session via a selection of the link 316, may become collaborative users 120 (e.g., user B 120b and user C 120c) of the session.

Figure 4:
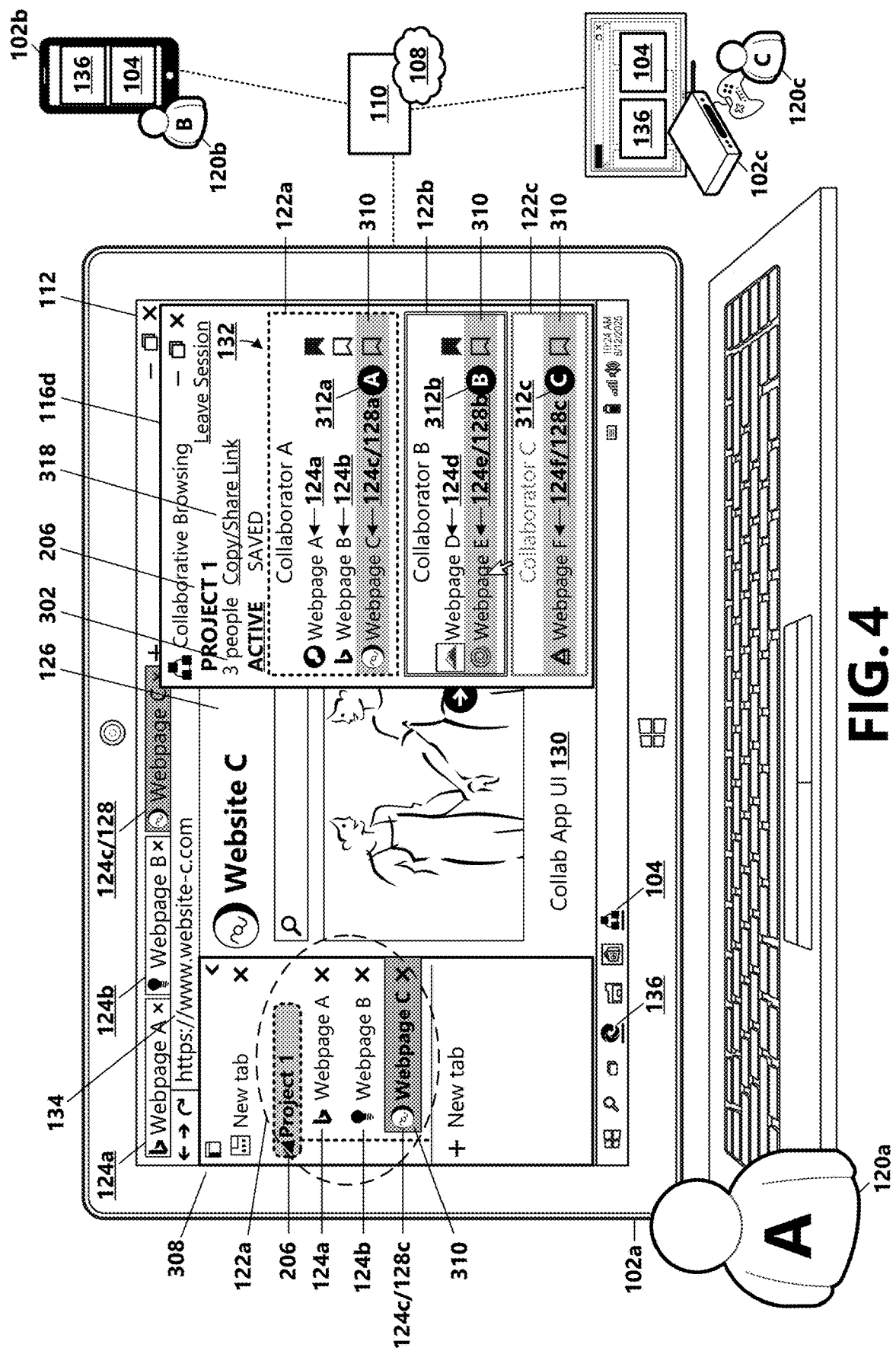
FIG. 4 is an illustration showing another example user interface that may be provided as part of a collaborative browsing session.

With reference now to FIG. 4, another example collaborative browsing client UI 116d is shown displayed on the display 112 of the client computing device 120a. For example, in response to user B 120b and user C 120c joining the collaborative browsing session, such as via a selection of session link 316 or entering the URL associated with the session link 316 in the address bar 134 of the web browser 136, the UI may be updated to add the local tab groups 122b,c of user B 120b and user C 120c to the collective tab group 132. In some implementations, an authentication and/or authorization process may be performed to grant authorized users 120 access to join the collaborative browsing session.

As shown in FIG. 4, data changes made in association with each user 120 may be communicated by the collaborative browsing client 104 operating on each user's client computing device 102 to the collaborative browsing service 110. In the example illustrated in FIG. 4, user B's client computing device 102b is shown as a mobile computing device, such as a smartphone device, and user C's client computing device 102c is shown as a gaming device. Other example client computing devices 102 are possible and are within the scope of the present disclosure. As described above, the data changes may then be sequenced by the collaborative browsing service 110 and the data changes and the sequence may then be communicated to the connected collaborative browsing clients 104 so that each client 104 can compute an eventually consistent state. For example, a data change associated with user B 120*b* and user C 120*c* joining the collaborative browsing service 110 may cause the collaborative browsing client 104 to update the collaborative browsing client UI 116 to add the tab groups 122*a-c* of the new project collaborators 120*b,c* to the collective tab group 132.

For example, and as shown in the example collaborative browsing client UI 116*c*, user A 120*a* may have 3 tabs 124*a-c* open and may be currently viewing an example webpage 126 represented as "Webpage C" as indicated by one or more active tab indicators 310, such as highlighting of the active tab 128*a* and a marker 312*a* associated with user A 120*a*. Additionally, user B 120*b* may have 2 tabs 124*d,e* open and may be currently viewing an example webpage 126 represented as "Webpage E" as indicated by one or more active tab indicators 310, such as highlighting of the active tab 128*b* and a marker 312*b* associated with user B 120*b*. Further, user C 120*c* may have 1 tab 124*f* open in which an example webpage 126 represented as "Webpage F" may be currently displayed in the web browser UI 130 of user C 120*c*, as indicated by one or more active tab indicators 310, such as highlighting of the active tab 128*c* and a marker 312*c* associated with user C 120*c*. In some examples, the tabs 124*a-f* included in the collective tab group 132 may operate as links to the associated webpages 126. For example, a selection of a tab 124 included in the collective tab group 132 may operate to open the associated webpage 126 in the user's web browser UI 130.

Figure 5:
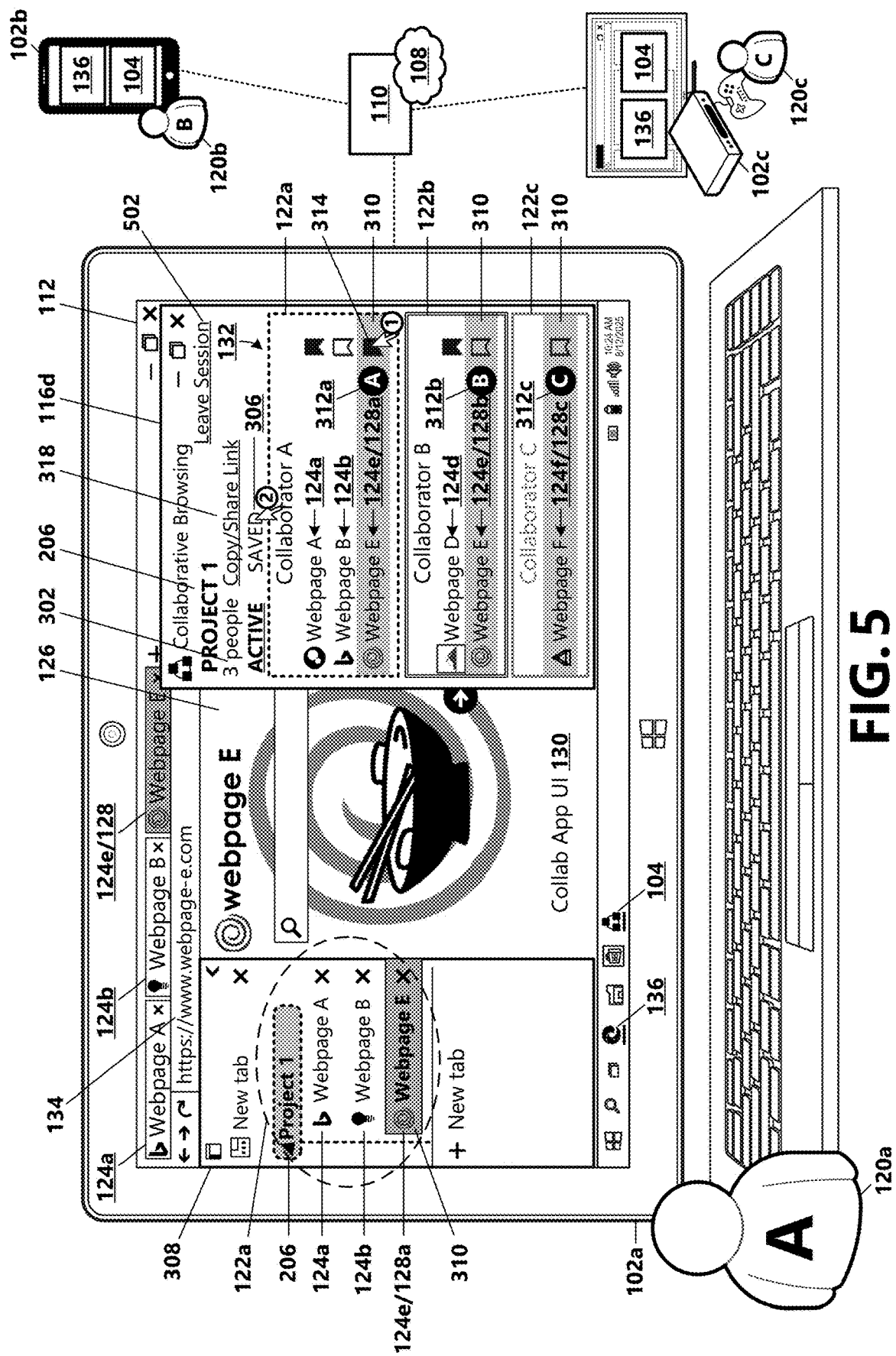
FIG. 5 is an illustration showing another example user interface that may be provided as part of a collaborative browsing session.

With reference now to FIG. 5, another example collaborative browsing client UI 116*d* is shown displayed on the display 112 of the user A's client computing device 102*a*. For example, in response to a selection of the tab 124*e* associated with webpage E displayed in user B's tab group 122*b*, the collaborative browsing client 104 operating on user A's client computing device 102*a* may communicate a request to the web browser 136 to navigate to the associated webpage 136 (e.g., webpage E). In some examples, the URL included in the address bar 134 of the web browser 136 may be changed from the URL associated with webpage C to the URL associated with webpage E, and the web browser 136 may load the requested webpage from the associated content resource 118. According to an example, the URL data change may cause user A's tab group 122 to update. For example, the active tab 128*a* may be changed from the tab representative of webpage C to a tab 124*e* representative of webpage E. The URL data change may further be communicated to the collaborative browsing service 110, which may then sequence the URL data change amongst other received data changes and communicate the data changes and sequence to the connected clients 104. For example, the URL data change may cause the collaborative browsing clients 104 to update user A's tab group 122 as performed by the collaborative browsing client 104 operating on user A's client computing device 102*a*, enabling the session collaborators to have a real-time view of user A's and the other users' browsing activity related to the project (e.g., Project 1).

With reference still to FIG. 5, in some implementations, a leave session control 502 may be provided in the collaborative browsing client UI 116, which when selected by user A 120*a*, may cause user A's connection to the collaborative browsing session to end. In some examples, user A's selection of the leave session control 502 may cause the collaborative browsing client 104 to remove the user A's tab group 122 from the tab pane 308. User A's disconnection from the collaborative browsing session may be communicated to the other users 120*b,c*, and user A's tab group 122 may be removed from the collective tab group 132 displayed on the other users' displays 112. In some examples, user A 120*a* may be enabled to rejoin the collaborative browsing session, such as via reselecting the session link 316 or entering the session link URL in the address bar 134 of the web browser 136. In some examples, a rejoin command associated with a collaborative browsing session may additionally be provided by the collaborative browsing client 104, which when selected, may operate to reconnect the collaborative browsing client 104 to the collaborative browsing service 110.

As described above, in some examples, a selectable save option 314 may be provided in association with each tab 124 included in each tab group 122 in the collective tab group 132. As shown in FIG. 5 with reference to a first position of user A's cursor indicated by circled numeral 1, user A 120*a* may select the save option 314 associated with a particular tab 124 to add the tab 124 to the saved resources list associated with the project. In the illustrated example, user A 120*a* may select the save option 314 for tab 124*e* associated with webpage E 124*e*. In response, tab 124*e* may be added to the saved resources list and an indication may be provided that webpage E 124*e* is saved or bookmarked. One example indication may include a change in appearance of the save option 314.

In some examples, and as shown in FIG. 5 with reference to a second position of user A's cursor indicated by a circled numeral 2, user A 120*a* may select the saved resources list selector 306 included in the collaborative browsing client UI 116 to view the saved resources list. In response, the collaborative browsing client 104 may operate to update the collaborative browsing client UI 116 to display the list of tabs 124 bookmarked or saved by one or more users 120.

With reference now to FIG. 6, another example collaborative browsing client UI 116*e* is shown, wherein the example collaborative browsing client UI 116*e* includes an example saved resources list 602 including a list of tabs 124*e*, 124*a*, 124*d* bookmarked or saved by one or more users 120. In some examples, the saved tabs 124*e*, 124*a*, 124*d* may be categorized into one or more saved tab groups 604*a-n* (generally, saved tab groups 604). As mentioned above, in some examples, a saved tab group 604 may be automatically determined for one or more tabs 124 based on an analysis of the corresponding webpage 126 data and/or metadata. As an example, a webpage 126 including content related to hiking trails may be determined to be related to hiking, and thus, a saved tab group 604*c* may be suggested or automatically inserted into the saved resources list 602. In some examples, saved tab group 604*c* may be automatically populated with one or more related saved tabs 124. The user 120 may further be enabled to move a saved tab 124 into a particular saved tab group 604. In other examples, and as shown in FIG. 6, the user 120 may select to add a new saved tab group 604 to the saved resources list 602 via a selection of an add group option 606 that may be provided in the example collaborative browsing client UI 116*e*.

With reference now to FIG. 7, another example collaborative browsing client UI 116*f* is shown, wherein the example collaborative browsing client UI 116*f* shows a new saved tab group 604*d* added to the saved resources list 602, for example, responsive to the selection of the add group option 606. As shown, the user 120 has changed the category or title of the saved tab group 604*d*. Accordingly, the data change may be communicated to other connected clients 104 and updated on their displays 112. Also shown in FIG. 7 is a movement of a saved tab 124e from an Inbox saved tab group 604a into another saved tab group 604.

As shown in another example collaborative browsing client UI 116g illustrated in FIG. 8, the saved tab 124e has been moved to the new saved tab group 604d that the user 120 has titled or categorized as "Restaurants." For example, the webpage 126 (webpage E) corresponding to the saved tab 124e moved by the user 120 into the Restaurants saved tab group 604d may be associated with a restaurant or include content related to a restaurant. Accordingly, the data change may be communicated to other connected clients 104 and updated on their displays 112. In some examples, the saved resources list 602 may further comprise additional project-related information.

Figure 9A:
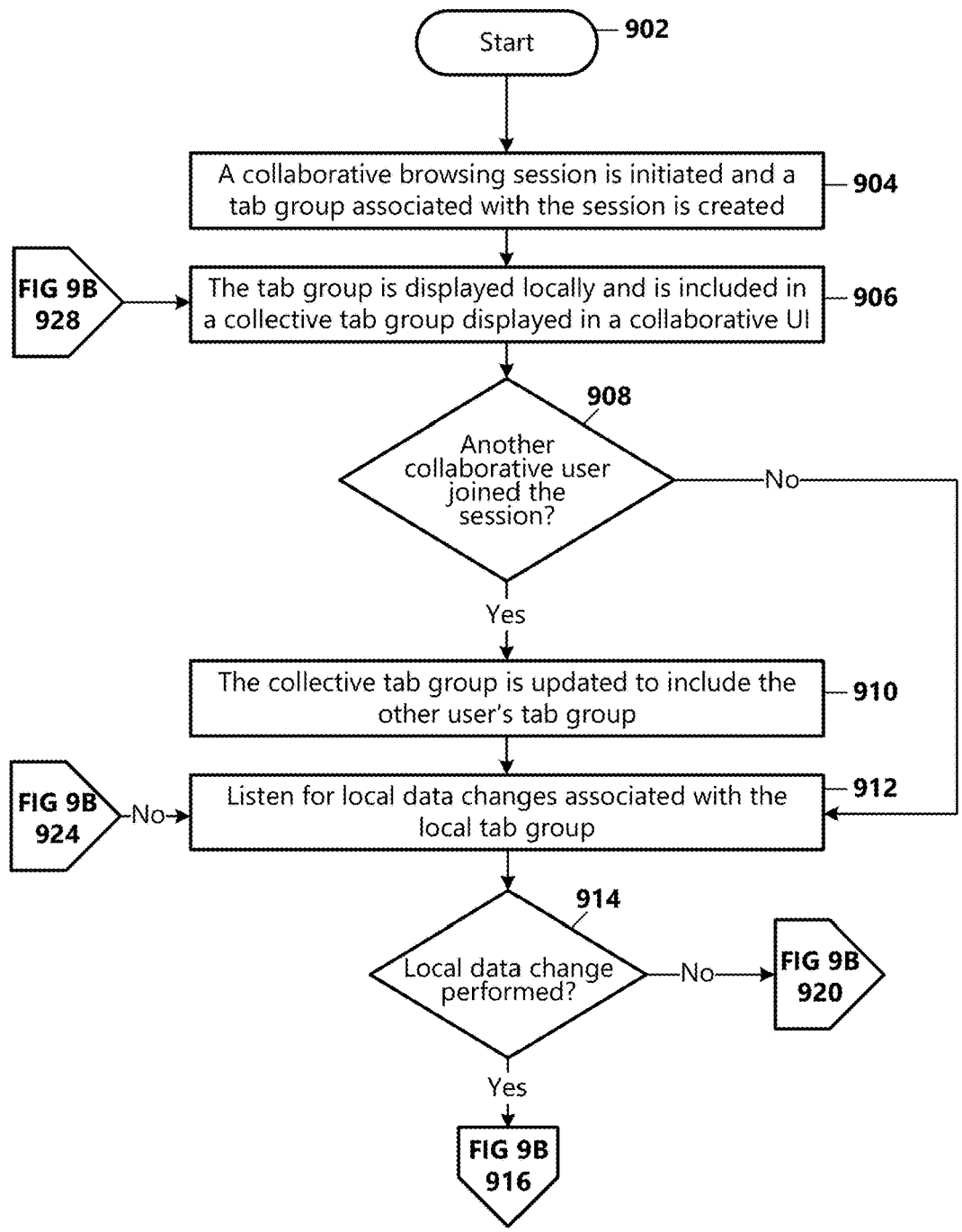
FIGS. 9A and 9B are a flow chart showing general stages involved in an example method for providing collaborative browsing.
Figure 9B:
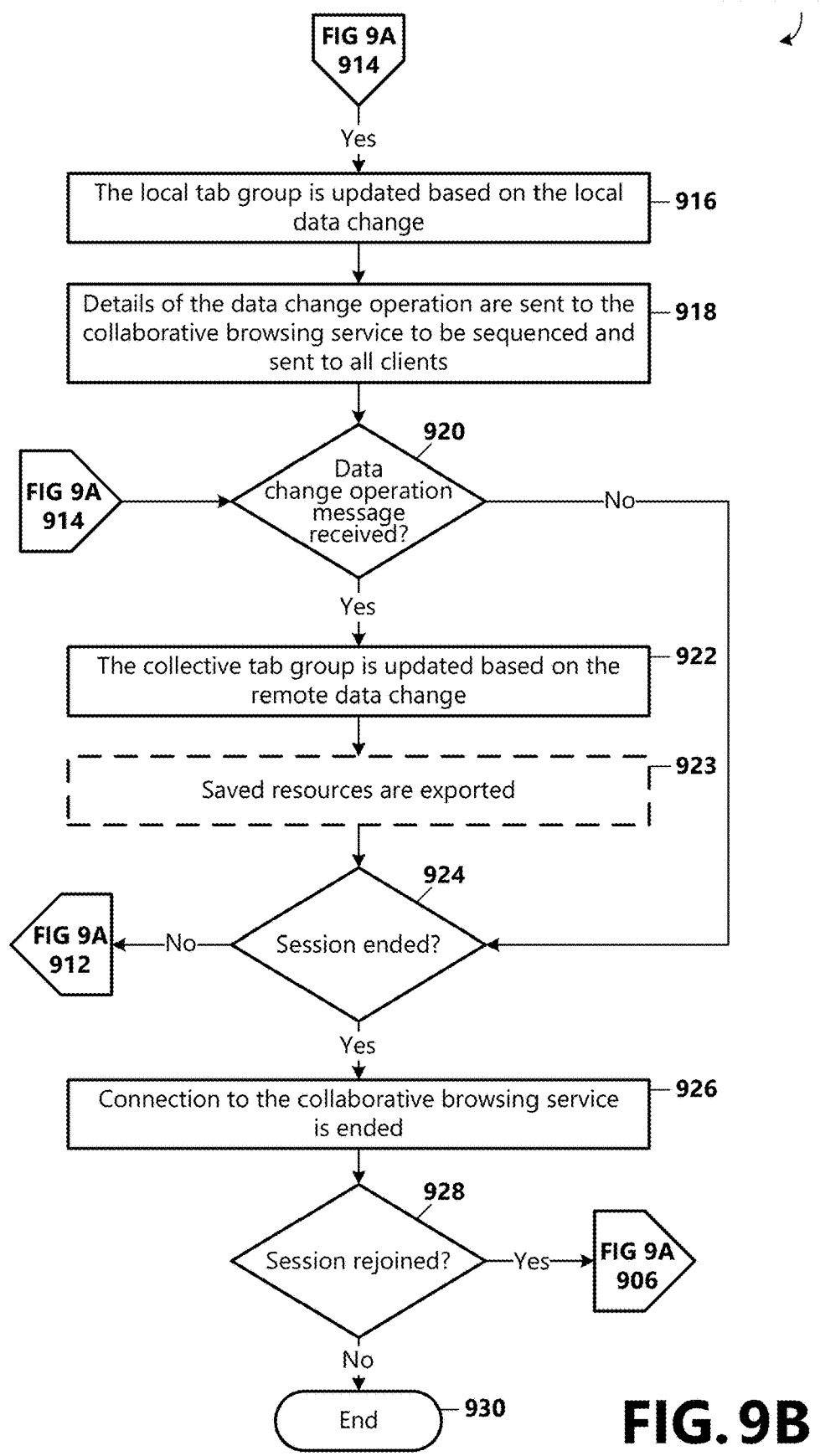
Figure 9C:
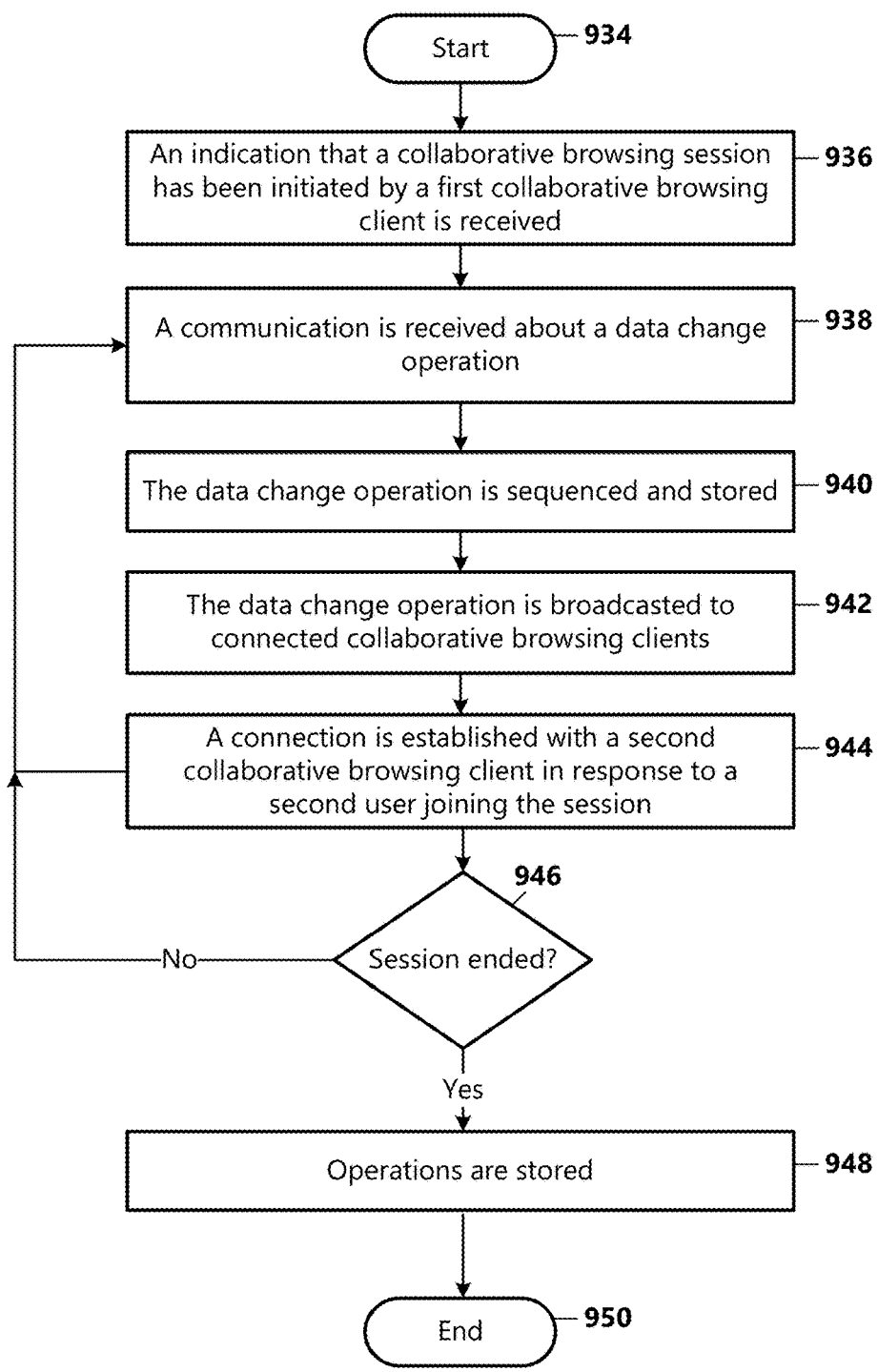
FIG. 9C is a flow chart showing general stages involved in another example method for providing collaborative browsing.

FIGS. 9A, 9B and 9C illustrate a flow chart showing general stages involved in example methods 900, 932 for providing a collaborative browsing session in which a workspace connected to a project in which real-time project related activity and saved project information resources can be shared with the project collaborators. For example, method 900 shown in FIGS. 9A and 9B include operations that may be performed by the collaborative browsing client 104, and method 932 shown in FIG. 9C includes operations that may be performed by the collaborative browsing service 110.

With reference now to FIG. 9A, the method 900 begins at start OPERATION 902, and proceeds to OPERATION 904, where a collaborative browsing session may be initiated. For example, the collaborative browsing client 104 may be opened by a first user 120a, which may connect with the collaborative browsing service 110 in response to receiving a selection to initiate a new a collaborative browsing session. In some examples, various details pertaining to the session may also be received. According to an example, a session link 316 may be generated that can be used to connect to the collaborative browsing session. In some examples, the collaborative browsing client 104 may further operate to create a first tab group 122a associated with the session and that is linked to the first user 120a. For example, the tab group 122a may be configured to include a list of one or more tabs 124 corresponding to one or more webpages 126 open in the first user's web browser 136 during the collaborative browsing session.

At OPERATION 906, the tab group 122a may be displayed locally on the first user's client computing device 102a. For example, the tab group 122a may be included in a tab pane 308 that may be included in the web browser UI 130. The tab group 122a may additionally be included in a collective tab group 132 for the collaborative browsing session that may include the tab group 122 of all the collaborative users 120 joined in the session. For example, the collective tab group 132 may be displayed in a collaborative browsing client UI 116 provided by the collaborative browsing client 104.

At DECISION OPERATION 908, a determination may be made as to whether another collaborative user 120 may have joined the collaborative browsing session. For example, the session link 316 may be shared with one or more other individuals and may be used by the one or more other individuals to connect to the collaborative browsing service 110 and join the collaborative browsing session. In some examples, when a second user 120b joins the collaborative browsing session, a message including information about the event may be communicated to the first user's collaborative browsing client 104a.

For example, when the second user 120b joins the session, a second tab group 122b associated with the session and linked to the second user 120b may be created. For example, the second tab group 122b may be generated remotely (from the first user 120a) by the second user's collaborative browsing client 104b. The creation of the second tab group 122b may be communicated to the collaborative browsing service 110, which may operate to sequence a data change operation associated with the addition of the second tab group 122b amongst any other received data changes and to broadcast the sequenced data change operations to the connected clients 104a,b. Accordingly, at OPERATION 910, the collective tab group 132 displayed in the collaborative browsing client UI 116 on the first user's client computing device 102a may be updated to include the second user's tab group 122b. In some examples, additional UI updates may be performed, such as an update to the indication 302 of the number of collaborative users 120 joined in the session.

At OPERATION 912, the collaborative browsing clients 104a,b may operate to monitor for local data changes associated with the session. For example, the collaborative browsing clients 104a,b may be configured to listen for various data changes related to the tab groups 122a,b. For example, the various data changes may be related to a user action, such as an action associated with opening, closing, or saving a webpage 126 or another user action.

At DECISION OPERATION 914, a determination may be made as to whether a local data change may be detected by the collaborative browsing client 104a, such as via using an event listener to monitor for a set of data changes. When a recognized data change event (e.g., opening, closing, or saving a webpage 126 or another action) is detected, the method 900 may proceed to OPERATION 916 in FIG. 9B where the collaborative browsing client 104a may perform an operation to change data in user A's tab group 122 or in the collective tab group 132 based on the recognized event.

At OPERATION 918, details of the data change operation may be sent to the collaborative browsing service 110. For example, the collaborative browsing service 110 may sequence the data change operation associated with user A's action amongst any other received data changes and broadcast the sequenced data change operations to the connected clients 104a,b.

At DECISION OPERATION 920, a determination may be made as to whether a data change operation message may be received from the collaborative browsing service 110 related to a remotely applied data change (e.g., by the second user's collaborative browsing client 104b). When a data change operation message is received, the method 900 may proceed to OPERATION 922, where the collaborative browsing client 104a may perform one or more sequenced operations to change local data in the collective tab group 132 based on the received message.

At OPTIONAL OPERATION 923, a selection may be made to output the saved resources list 602. For example, one or more tabs 124 included in the collective tab group 132 may be saved to the saved resources list 602, and an option may be provided by the collaborative browsing client 104 to export the saved resources list 602, such as to an electronic communication tool for browsing the saved resources list 602 with the collaborative users 120, to a printer, to a storage device, to a planning tool, or the like.

At OPERATION 924, a determination may be made as to whether the first user 120a has ended the collaborative browsing session. In some examples, if the first collaborative browsing client 104a is still connected to the collaborative browsing service 110, the method 900 may return to OPERATION 912, where the collaborative browsing client 104a may continue to monitor for data change events. In other examples, if the first user 120a selects to leave the session, such as via a selection of the leave session control 520, the connection to the collaborative browsing service 110 may be ended at OPERATION 928. For example, a message corresponding to the first user 120a leaving the collaborative browsing session may be communicated to the other user 120b, and the collaborative browsing client UI 116 displayed on the other user's client computing device 120b may be updated based on the message (e.g., the first user's tab group 122a may be removed from the collective tab group 132).

At DECISION OPERATION 928, a determination may be made as to whether the first user 120a has rejoined the collaborative browsing session. For example, the first user 120a may select the session link 316 or enter the URL associated with the session link 316 to rejoin the session. When the first user 120a reconnects with the collaborative browsing session, the method 900 may return to OPERATION 906, where the first user's tab group 122a may be generated and included in the collective tab group 132. If the first user 120a does not select to rejoin the collaborative browsing session, the method 900 may end at OPERATION 930.

With reference now to FIG. 9C, an example method 932 is described that includes operations that may be performed by the collaborative browsing service 110 as part of providing a collaborative browsing session in which a workspace connected to a project in which real-time project related activity and saved project information resources can be shared with the project collaborators. The method 932 begins at start OPERATION 934, and proceeds to OPERATION 936, where an indication of an initiation of a collaborative browsing session may be received. For example, in response to a first user 120a selecting to initiate the collaborative browsing session via a first collaborative browsing client 104, the first collaborative browsing client 104 may connect with the collaborative browsing service 110. In some examples, the collaborative browsing session may be established between the first collaborative browsing client 104 and the collaborative browsing service 110, and a session link 316 may be generated that can be used by other clients to connect to the collaborative browsing session.

At OPERATION 938, a communication may be received from the first collaborative browsing client 104 about a data change operation. For example, a first tab group 122a linked to the first user 120a may be created that may operate to include one or more webpages 126 open in the first user's web browser 136 during the collaborative browsing session. Accordingly, information about the creation of the first tab group 122a may be received by the collaborative browsing service 110.

At OPERATION 940, the data change operation may be sequenced and stored. For example, the collaborative browsing service 110 may give the data change operation a sequential order number. In some examples, the sequenced data change operation may be stored in a session storage that may be managed by the collaborative browsing service 110. The session storage may store a record of the operations received by connected collaborative browsing clients 104. For example, this record may be used by the connected collaborative browsing clients 104 to produce identical local instances of the current state. In some examples, the session storage may further include operations that summarize past operations to improve performance for clients that join sessions later and for efficiencies when saving to persistent storage. For example, a persistent storage may include a database, blob storage, or a file that may be remote or local to the collaborative browsing service 110 and that may store and persist a record of operations and summary operations across collaborative browsing sessions.

At OPERATION 942, the ordered operation may be sent to one or more clients joined in the collaborative browsing session, which, at this time, includes the first collaborative browsing client 104.

At OPERATION 944, an indication of a second user 120b joining the collaborative browsing session may be received. For example, in response to the second user 120b selecting or entering the session link 316 associated with the collaborative browsing session, the second collaborative browsing client 104 may connect with the collaborative browsing service 110.

The method 932 may return to OPERATION 938, where a communication may be received from the second collaborative browsing client 104 about a data change operation. For example, a second tab group 122b linked to the second user 120b may be created. Accordingly, information about the creation of the second tab group 122b may be received by the collaborative browsing service 110, which at OPERATION 940, may be sequenced and stored, and at OPERATION 942, may be broadcasted to each connected collaborative browsing client 104. Accordingly, each connected collaborative browsing client 104 may update the collective tab group 132 displayed on the associated client computing devices 102a,b by incorporating the sequenced data change operations into local data and then handling the data change operations, such as via updating the collaborative browsing client UI 116. Accordingly, real-time browsing activity information associated with each user 120a,b joined in the collaborative browsing session may be provided.

In some examples, at DECISION OPERATION 946, a determination may be made as to whether the collaborative browsing session has ended. For example, the collaborative browsing session may end when each connected collaborative browsing client 104 ends the connection with the collaborative browsing service 110. When the collaborative browsing session has ended, at OPERATION 948, the data change operations associated with the collaborative browsing session may be stored in persistent storage, as discussed with respect to OPERATION 940.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval, and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 10:
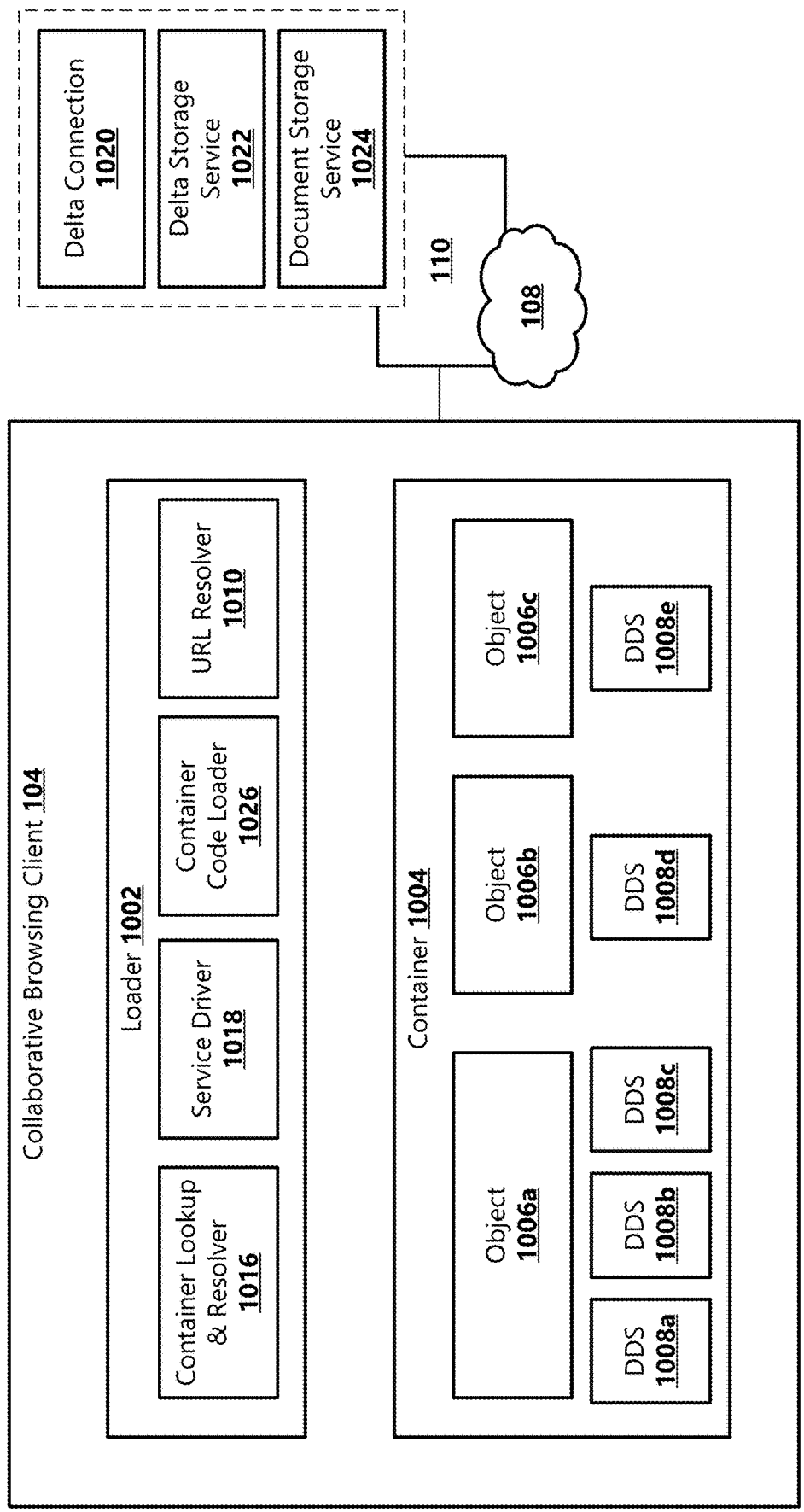
FIG. 10 is a block diagram illustrating an example system architecture in which the collaborative browsing system can be implemented.

FIG. 10 is a block diagram illustrating an example collaborative system architecture 1000 which may be used to implement various aspects of the collaborative browsing system 100 illustrated in FIG. 1. For example, the example collaborative architecture 1000 may support a collaborative framework, such as FLUID FRAMEWORK by MICROSOFT CORPORATION of Redmond, WA.

The collaborative system architecture 1000 may include a loader 1002, containers 1004a-n (generally, containers 1004), and the collaborative browsing service 110. In some examples, the loader 1002 may be configured to connect to the collaborative browsing service 110 and load a container 1004. For example, the container 1004 may include state and collaborative browsing client 104 logic. For example, the container 1004 may enable the system 100 to operate as a serverless application model with data persistence. The container 1004 may include at least one object 1006a-n (generally, objects 1006), which may encapsulate the collaborative browsing client 104 logic. For example, the objects 1006 can have state, which may be managed by distributed data structures (DDSes 1008a-n (generally, DDS 1008)). In some examples, the DDSes 1008 may be used to distribute state to connected collaborative browsing clients 104. For example, instead of centralizing merge logic in the server 114, the collaborative browsing service 110 may be configured to pass changes (i.e., operations or data change operations) to collaborative browsing clients 104, and the collaborative browsing clients 104 may operate to perform the merge.

In some examples, the container 1004 may define the application logic while comprising persistent data. For example, the container 1004 may be configured to interact with the process and distribute operations, manage lifecycle of objects 1006, and provide a request API for accessing objects 1006. The container 1004 may operate as a serverless application and data. In some examples, the container 1004 may further include the merge logic used by the collaborative browsing clients 104 to replicate state across connected clients. In some examples, the merge logic may be encapsulated in the DDSes 1008. Collaborative browsing client 104 logic operating over this data may be stored in one or more objects 1006.

In some examples, the loader 1002 may be configured to load containers 1004 (and their child objects 1006) by connecting to the collaborative browsing service 110 and fetching container 1004 code. In this way, the loader 1002 may operate to resolve a URL of a container 1004 (e.g., using a URL resolver 1010), connect to the collaborative browsing service 110 using a service driver 1018, and load the container 1004 using a code loader 1026.

In some examples, the container lookup and resolver 1016 may be configured to identify, by the URL, which collaborative browsing service 110 a container 1004 may be bound to and where in that service it is located. The service driver 1018 may be configured to use this information to connect to the collaborative browsing service 110 and request space on the server 114 for new containers 1004. For example, when the loader 1002 resolves the container 1004, it may be configured to pass the container 1004 a group of service drivers. In some examples, the service driver 1018 may operate to create a delta connection object 1020, a delta storage service 1022, and a document storage service 1024. For example, the container 1004 may be enabled to use the delta connection object 1020, the delta storage service 1022, and the document storage service 1024 to communicate with the collaborative browsing service 110 and maintain an eventually consistent state.

In some examples, the container code loader 1026 may be configured to fetch container 1004 code. Because all collaborative browsing clients 104 may operate to run the same code, the collaborative browsing clients 104 may use the code loader 1026 to fetch container 1004 code. For example, the loader 1002 may be configured to execute this code to create containers 1004.

According to examples, the collaborative browsing service 110 may be configured to receive changes (i.e., operations or data change operations) from each collaborative browsing client 104, provide the data change operation a sequential order number, and send the ordered operation back to each collaborative browsing client 104. The DDSes 1008 may be configured to use these ordered operations to reconstruct state on each client collaborative browsing client 104. In some examples, the container 1004 may be responsible for passing data change operations to the relevant DDSes 1008 and objects 1006. According to an example, the collaborative browsing service 110 may not operate to parse any of these data change operations; that is, the collaborative browsing service 110 may not have knowledge of the contents of any container 1004. The container 1004 may be interacted with through the request paradigm. For example, to retrieve a default data store, a request may be performed on the container 1004, which may return a status code and the default data store.

From the collaborative browsing client 104 perspective, the data change operations flow may be accessed through the delta connection object 1020. For example, a container 1004 may include code to process operations from the delta connection object 1020, catch up on missed operations using the delta storage service 1022, and create or fetch summaries from the document storage service 1024. In some examples, the collaborative browsing service 110 may operate to store old data change operations, which may be accessible to collaborative browsing clients 104 through delta storage service 1022. In some examples, the document storage service 1024 may store summaries of the objects (e.g., the state of objects may be summarized and stored for faster loading).

Figure 11:
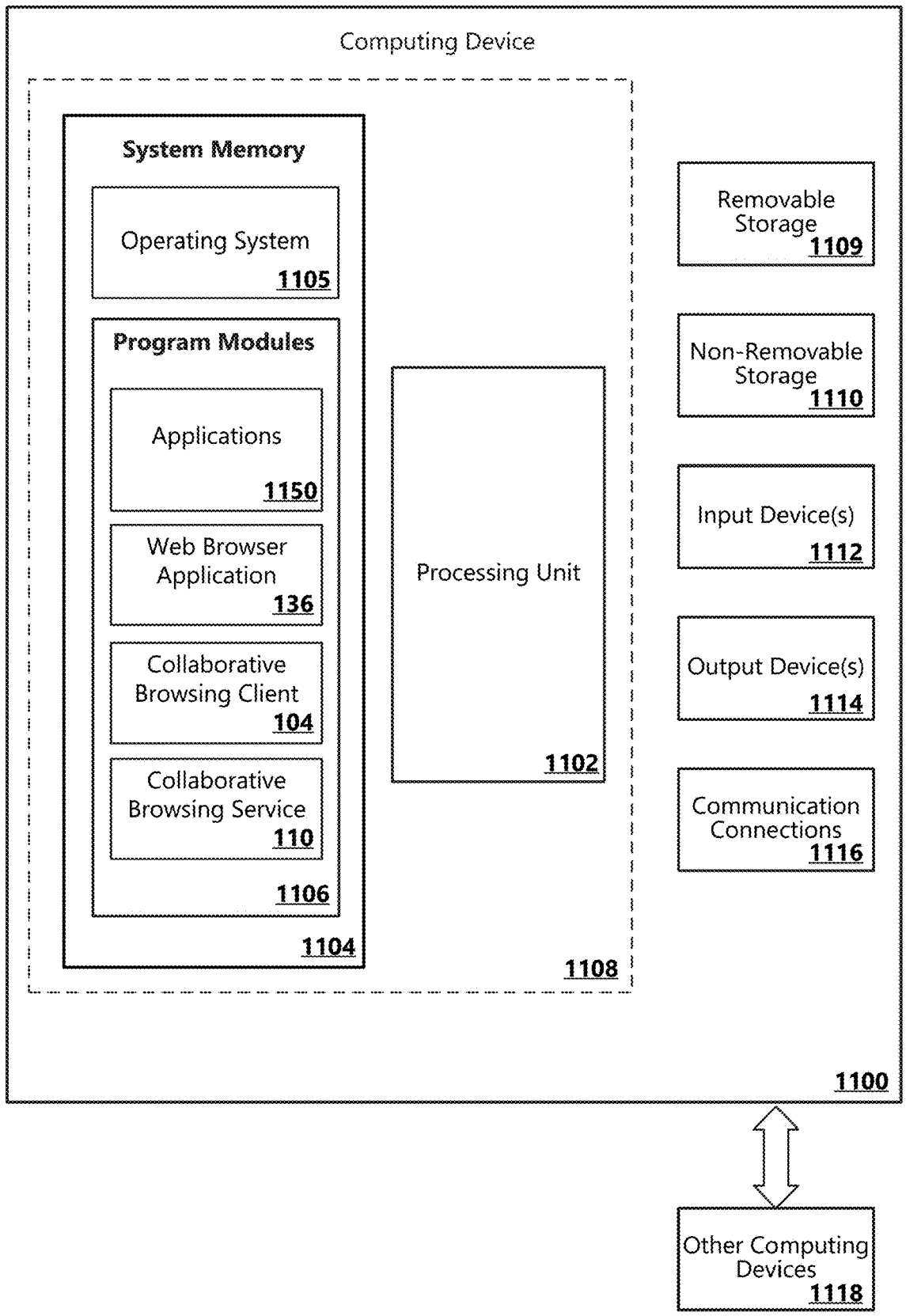
FIG. 11 is a block diagram illustrating example physical components of a computing device.
Figure 12A:
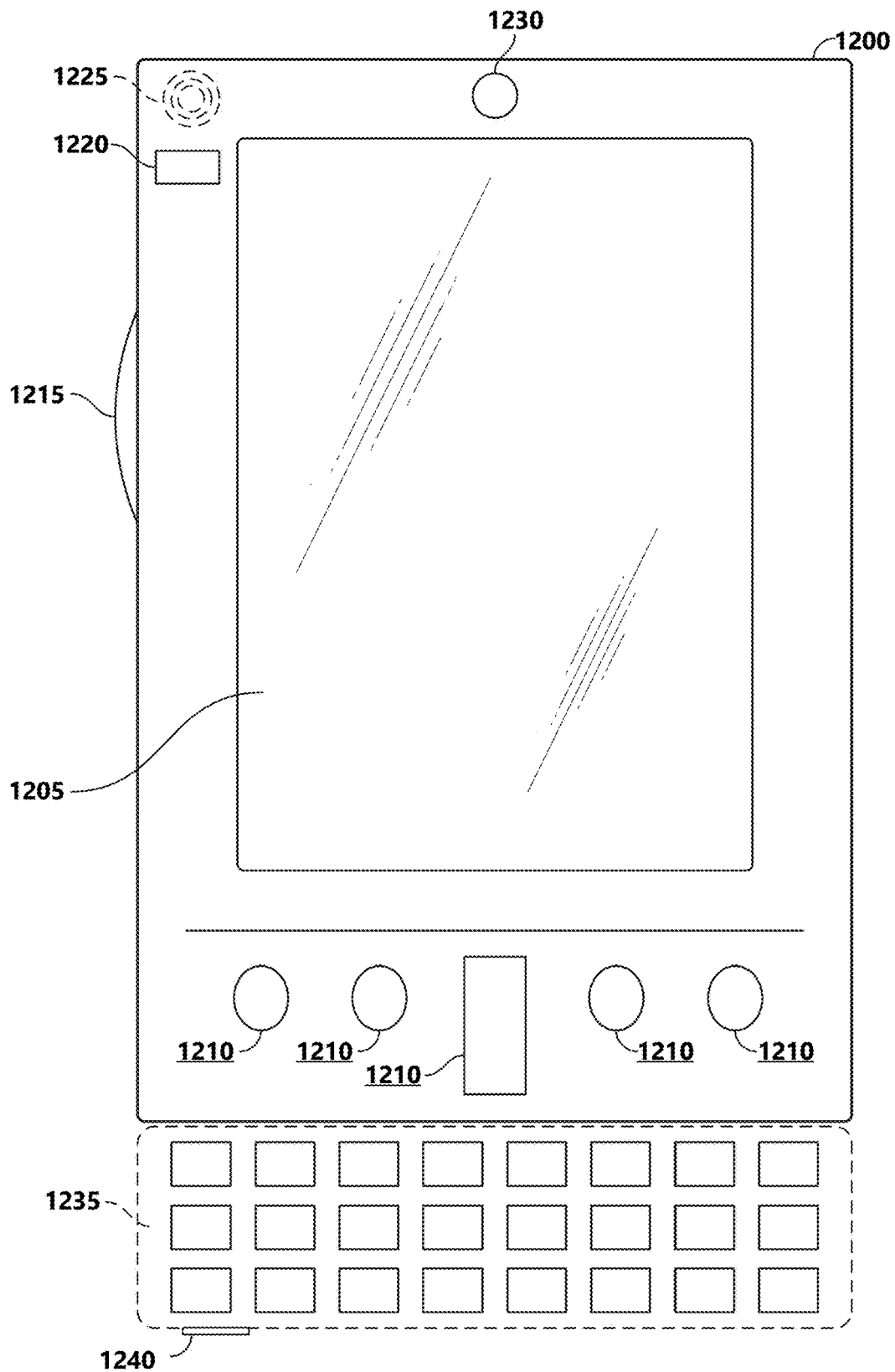
FIGS. 12A and 12B are block diagrams of a mobile computing device.
Figure 12B:
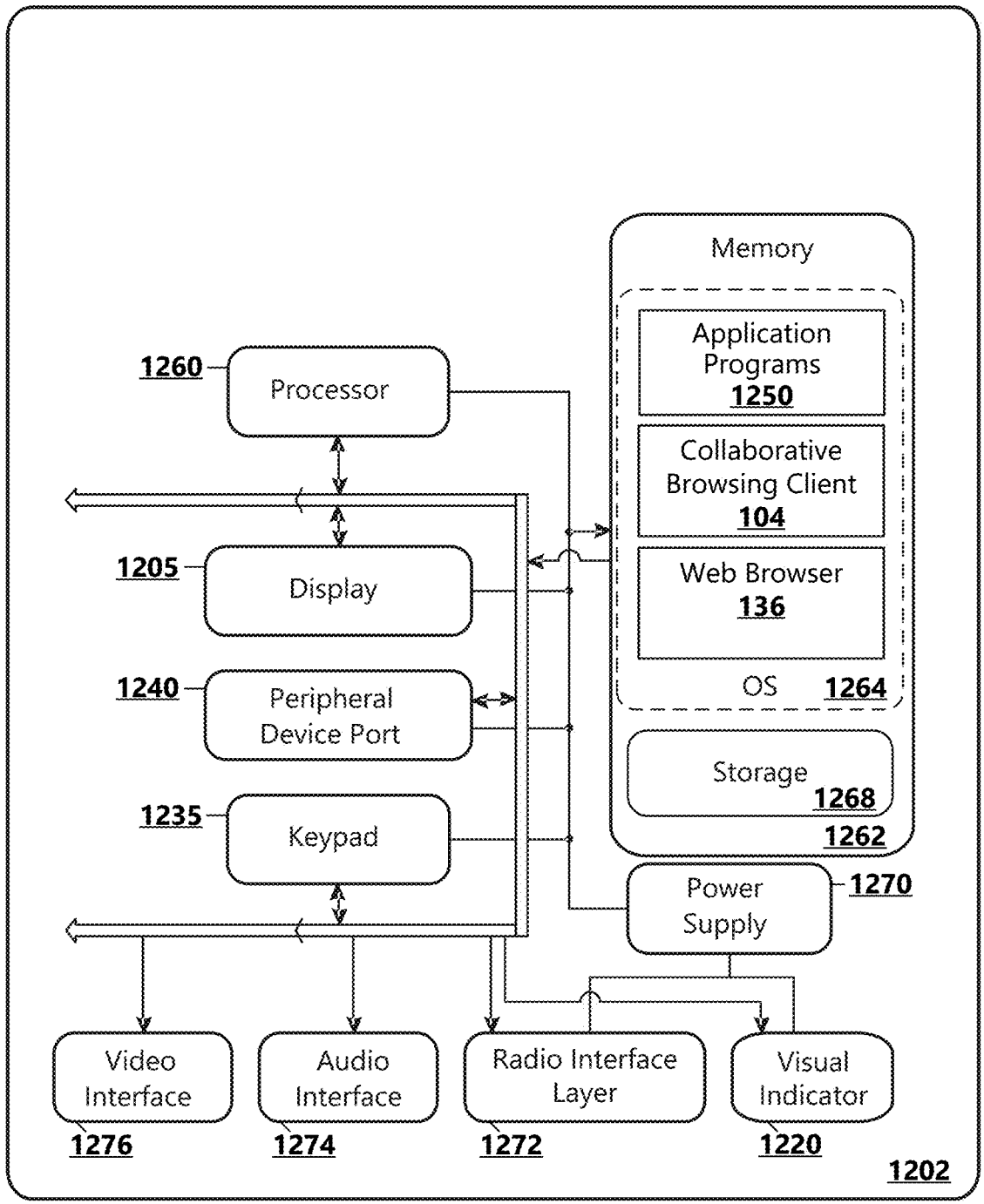
Figure 13:
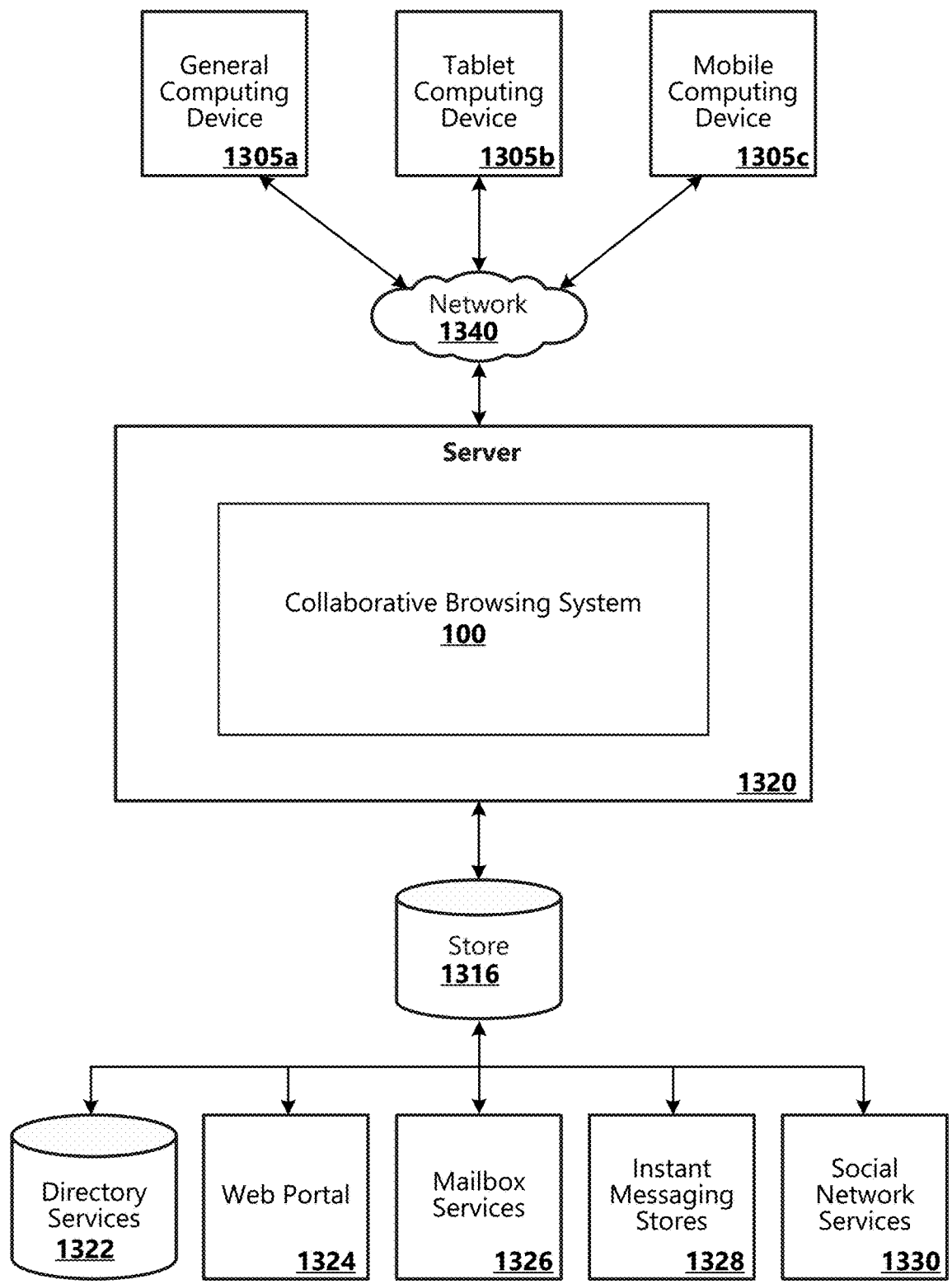
FIG. 13 is a block diagram of a distributed computing system.

FIGS. 11-13 and the associated descriptions provide a discussion of a variety of operating environments in which examples are practiced. However, the devices and systems illustrated and discussed with respect to FIGS. 11-13 are for purposes of example and illustration and are not limiting of a vast number of computing device configurations that are used for practicing aspects, described herein.

FIG. 11 is a block diagram illustrating physical components (i.e., hardware) of a computing device 1100 with which examples of the present disclosure may be practiced. In a basic configuration, the computing device 1100 includes at least one processing unit 1102 and a system memory 1104. According to an aspect, depending on the configuration and type of computing device, the system memory 1104 comprises, but is not limited to, volatile storage (e.g., random access memory), non-volatile storage (e.g., read-only memory), flash memory, or any combination of such memories. According to an aspect, the system memory 1104 includes an operating system 1105 and one or more program modules 1106 suitable for running software applications 1150. According to another aspect, the system memory 1104 includes the web browser 136 and the collaborative browsing client 104. The operating system 1105, for example, is suitable for controlling the operation of the computing device 1100. Furthermore, aspects are practiced in conjunction with a graphics library, other operating systems, or any other application program, and is not limited to any particular application or system. This basic configuration is illustrated in FIG. 11 by those components within a dashed line 1108. According to an aspect, the computing device 1100 has additional features or functionality. For example, according to an aspect, the computing device 1100 includes additional data storage devices (removable and/or non-removable) such as, for example, magnetic disks, optical disks, or tape. Such additional storage is illustrated in FIG. 11 by a removable storage device 1109 and a non-removable storage device 1110.

As stated above, according to an aspect, a number of program modules and data files are stored in the system memory 1104. While executing on the processing unit 1102, the program modules 1106 (e.g., the web browser 136, the collaborative browsing client 104, or the collaborative browsing service 110) perform processes including, but not limited to, one or more of the stages of the method 900 illustrated in FIGS. 9A and 9B or method 932 illustrated in FIG. 9C. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit using a microprocessor, or on a single chip containing electronic elements or microprocessors. For example, aspects are practiced via a system-on-a-chip (SOC) where each or many of the components illustrated in FIG. 11 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 1100 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 1100 has one or more input device(s) 1112 such as a keyboard, a mouse, a pen, a sound input device, a touch input device, etc. The output device(s) 1114 such as a display, speakers, a printer, etc. are also included according to an aspect. The aforementioned devices are examples and others may be used. According to an aspect, the computing device 1100 includes one or more communication connections 1116 allowing communications with other computing devices 1118. Examples of suitable communication connections 1116 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. According to an aspect, any such computer storage media is part of the computing device 1100. Computer storage media do not include a carrier wave or other propagated data signal.

According to an aspect, communication media are embodied by computer readable instructions, data structures, program modules, or other data in a modulated data signal, such as a carrier wave or other transport mechanism, and includes any information delivery medium. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 12A and 12B illustrate a mobile computing device 1200, for example, a mobile telephone, a smart phone, a tablet personal computer, a laptop computer, and the like, with which aspects may be practiced. With reference to FIG. 12A, an example of a mobile computing device 1200 for implementing the aspects is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. According to an aspect, the display 1205 of the mobile computing device 1200 functions as an input device (e.g., a touch screen display). If included, an optional side input element 1215 allows further user input. According to an aspect, the side input element 1215 is a rotary switch, a button, or any other type of manual input element. In alternative examples, mobile computing device 1200 incorporates more or less input elements. For example, the display 1205 may not be a touch screen in some examples. In alternative examples, the mobile computing device 1200 is a portable phone system, such as a cellular phone.

According to an aspect, the mobile computing device 1200 includes an optional keypad 1235. According to an aspect, the optional keypad 1235 is a physical keypad. According to another aspect, the optional keypad 1235 is a "soft" keypad generated on the touch screen display. In various aspects, the output elements include the display 1205 for showing a graphical user interface (GUI), a visual indicator 1220 (e.g., a light emitting diode), and/or an audio transducer 1225 (e.g., a speaker). In some examples, the mobile computing device 1200 incorporates a vibration transducer for providing the user with tactile feedback. In yet another example, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 1200 incorporates peripheral device port 1240, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one example of a mobile computing device. That is, the mobile computing device 1200 incorporates a system (i.e., an architecture) 1202 to implement some examples. In one example, the system 1202 is implemented as a "smart phone" capable of running one or more applications (e.g., browser, e-mail, calendaring, contact managers, messaging clients, games, and media clients/players). In some examples, the system 1202 is integrated as a computing device, such as an integrated personal digital assistant (PDA) and wireless phone.

According to an aspect, one or more application programs 1250 are loaded into the memory 1262 and run on or in association with the operating system 1264. Examples of the application programs include phone dialer programs, e-mail programs, personal information management (PIM) programs, word processing programs, spreadsheet programs, Internet browser programs (e.g., web browser 136), messaging programs, and so forth. According to an aspect, the collaborative browsing client 104 is loaded into the memory 1262 and run on or in association with the operating system 1264. According to another aspect, one or more components of the audio channel quick task system 200 are loaded into memory 1262. The system 1202 also includes a non-volatile storage area 1268 within the memory 1262. The non-volatile storage area 1268 is used to store persistent information that should not be lost if the system 1202 is powered down. The application programs 1250 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200.

According to an aspect, the system 1202 has a power supply 1270, which is implemented as one or more batteries. According to an aspect, the power supply 1270 further includes an external power source, such as an AC adapter or a powered docking cradle that supplements or recharges the batteries.

According to an aspect, the system 1202 includes a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1250 via the operating system 1264, and vice versa.

According to an aspect, the visual indicator 1220 is used to provide visual notifications and/or an audio interface 1274 is used for producing audible notifications via the audio transducer 1225. In the illustrated example, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. According to an aspect, the system 1202 further includes a video interface 1276 that enables an operation of an on-board camera 1230 to record still images, video stream, and the like.

According to an aspect, a mobile computing device 1200 implementing the system 1202 has additional features or functionality. For example, the mobile computing device 1200 includes additional data storage devices (removable and/or non-removable) such as, magnetic disks, optical disks, or tape. Such additional storage is illustrated in FIG. 12B by the non-volatile storage area 1268. According to an aspect, data/information generated or captured by the mobile computing device 1200 and stored via the system 1202 is stored locally on the mobile computing device 1200, as described above. According to another aspect, the data is stored on any number of storage media that are accessible by the device via the radio 1272 or via a wired connection between the mobile computing device 1200 and a separate computing device associated with the mobile computing device 1200, for example, a server computer in a distributed computing network, such as the Internet. As should be appreciated such data/information is accessible via the mobile computing device 1200 via the radio 1272 or via a distributed computing network. Similarly, according to an aspect, such data/information is readily transferred between computing devices for storage and use according to well-known data/information transfer and storage means, including electronic mail and collaborative data/information browsing systems.

FIG. 13 illustrates one example of the architecture of a system for providing a collaborative browsing workspace and session in which real-time project-related activity and saved project-related activity of the browsing session collaborators can be shared amongst the collaborators, as described above. Content developed, interacted with, or edited in association with the one or more components of the collaborative browsing system 100 are enabled to be stored in different communication channels or other storage types. For example, various documents may be stored using a directory service 1322, a web portal 1324, a mailbox service 1326, an instant messaging store 1328, or a social networking site 1330. One or more components of the collaborative browsing system 100 are operative or configured to use any of these types of systems or the like for providing automated quick task notifications via an audio channel, as described herein. According to an aspect, a server 1320 provides the one or more components of collaborative browsing system 100 to client computing devices 1305a,b,c. As one example, the server 1320 may be a web server providing one or more components of the collaborative browsing system 100 over the web. The server 1320 provides one or more components of the collaborative browsing system 100 over the web to clients 1305 through a network 1340. By way of example, the computing device may be implemented and embodied in a personal computer computing device 1305a, a tablet computing device 1305b or a mobile computing device 1305c (e.g., a smart phone), or other computing device. Any of these examples of the computing device are operable to obtain content from the store 1316.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A system comprising:
a processor; and
computer memory storing computer-readable instructions that, when executed, perform operations comprising:
including, in a collective tab group, a first tab group associated with a first collaborative browsing client operating on a first client computing device, wherein the first tab group includes one or more tabs corresponding to one or more webpages open in a web browser of the first client computing device during a browsing session; and
in response to receiving a data change event related to the first tab group, performing an associated data change operation for the collective tab group.

2. The system of claim 1, wherein initiating the browsing session by the first collaborative browsing client:
generates the first tab group; and
generates a session link to the browsing session.

3. The system of claim 1, the operations further comprising:
providing the collective tab group for display in a collaborative user interface.

4. The system of claim 3, the operations further comprising:
receiving an indication that a second client computing device has joined the browsing session; and
in response to the second client computing device joining the browsing session, updating the collaborative user interface with a second tab group associated with a second collaborative browsing client operating on the second client computing device.

5. The system of claim 4, wherein performing the associated data change operation causes the collective tab group to be updated on the first client computing device and the second client computing device.

6. The system of claim 1, wherein the data change event corresponds to:
opening at least one of the one or more webpages;
closing at least one of the one or more webpages; or
saving at least one of the one or more webpages.

7. The system of claim 1, the operations further comprising:
further in response to receiving the data change event, sequencing the data change event to generate a sequenced event; and
broadcasting the sequenced event to other client computing devices connected to the browsing session.

8. The system of claim 1, the operations further comprising:
after performing the associated data change operation, receiving a selection to output a list of tabs in the collective tab group; and
outputting the list of tabs.

9. The system of claim 1, the operations further comprising:
in response to determining the first collaborative browsing client has ended the browsing session:
notifying other client computing devices connected to the browsing session that the first client computing device has exited the browsing session; and
continuing the browsing session.

10. The system of claim 1, the operations further comprising:
in response to determining the first collaborative browsing client has ended the browsing session:
exited the browsing session by terminating the browsing session for one or more other computing devices connected to the browsing session.

11. A method comprising:
including, in a collective tab group of a collaborative browsing session, a first tab group associated with a first collaborative browsing client operating on a first device, wherein the first tab group includes a tab corresponding to a webpage open on the first device;
updating a collaborative user interface comprising the collective tab group with a second tab group associated with a second collaborative browsing client operating on a second device; and
in response to receiving a data change event related to the first tab group or the second tab group, performing an associated data change operation for the collective tab group.

12. The method of claim 11, wherein the collaborative browsing session provides a project workspace in which real-time project activity and saved project resources are shared by a first user of the first device and a second user of the second device.

13. The method of claim 11, wherein the second collaborative browsing client joins the collaborative browsing session using a session link provided to the second collaborative browsing client by the first collaborative browsing client.

14. The method of claim 13, wherein the session link is generated and provided to the first collaborative browsing client when the first collaborative browsing client creates the collaborative browsing session.

15. The method of claim 11, wherein the associated data change operation causes the collective tab group to be updated on the first device and the second device.

16. The method of claim 11, wherein the data change event corresponds to:
   a change to a note or comment associated with the tab; or
   a user vote associated with the tab.

17. The method of claim 11, the method further comprising:
   exiting, by the first device, the collaborative browsing session, wherein the exiting:
      causes the first tab group to be removed from the collective tab group; and
      does not cause the second tab group to be removed from the collective tab group.

18. The method of claim 17, the method further comprising:
   rejoining, by the first device, the collaborative browsing session, wherein the rejoining:
      causes the first tab group to be added to the collective tab group; and
      notifies the second collaborative browsing client that the first device has rejoined.

19. The method of claim 11, wherein tabs in the collective tab group are grouped according to one or more attributes of corresponding webpages using machine learning techniques.

20. A device comprising:
   a processor; and
   computer memory storing computer-readable instructions that, when executed, perform operations comprising:
      including, in a collective tab group, a first tab group associated with a first collaborative browsing client during a browsing session, wherein the first tab group includes a first tab corresponding to a first webpage open in a first web browser associated with the first collaborative browsing client;
      including, in the collective tab group, a second tab group associated with a second collaborative browsing client during the browsing session, wherein the second tab group includes a second tab corresponding to a second webpage open in a second web browser associated with the second collaborative browsing client; and
      in response to receiving a data change event related to the first tab group or the second tab group, performing an associated data change operation for the collective tab group.

* * * * *